US008140601B2

(12) United States Patent
Plastina et al.

(10) Patent No.: US 8,140,601 B2
(45) Date of Patent: Mar. 20, 2012

(54) LIKE PROCESSING OF OWNED AND FOR-PURCHASE MEDIA

(75) Inventors: Daniel Plastina, Sammamish, WA (US); Michael J. Novak, Redmond, WA (US); Kipley J. Olson, Mercer Island, WA (US); Michael M. Tse, Bellevue, WA (US); David M. Nadalin, Sammamish, WA (US); Phillip Lu, Kirkland, WA (US); Dennis A. Kiilerich, Kirkland, WA (US); Andrew L. Silverman, Redmond, WA (US)

(73) Assignee: Microsoft Coporation, Redmond, WA (US)

( * ) Notice: Subject to any disclaimer, the term of this patent is extended or adjusted under 35 U.S.C. 154(b) by 1169 days.

(21) Appl. No.: 11/279,873

(22) Filed: Apr. 14, 2006

(65) Prior Publication Data
US 2007/0083556 A1 Apr. 12, 2007

Related U.S. Application Data

(63) Continuation-in-part of application No. 11/202,556, filed on Aug. 12, 2005, and a continuation-in-part of application No. 11/202,900, filed on Aug. 12, 2005, and a continuation-in-part of application No. 11/202,562, filed on Aug. 12, 2005.

(51) Int. Cl.
*G06F 12/00* (2006.01)
(52) U.S. Cl. ..................................... 707/821
(58) Field of Classification Search ............... 707/104.1, 707/821
See application file for complete search history.

(56) References Cited

U.S. PATENT DOCUMENTS

| 5,673,430 | A |   | 9/1997 | Story |
| 5,884,298 | A | * | 3/1999 | Smith et al. ............... 707/2 |
| 6,118,450 | A |   | 9/2000 | Proehl et al. |
| 6,243,725 | B1 |  | 6/2001 | Hempleman et al. |
| 6,311,194 | B1 |  | 10/2001 | Sheth et al. |
| 6,452,609 | B1 |  | 9/2002 | Katinsky et al. |

(Continued)

FOREIGN PATENT DOCUMENTS

GB 2380378 A 2/2003

(Continued)

OTHER PUBLICATIONS

Lee, et al., An Effective Architecture of Advanced TV Set-Top and Interactive Services Using TV-Anytime Metadata, http://www.broadcastpapers.com/data/IBCETRITVAnytimeMetadata.pdf, no date, 6 pp., Electronics and Telecommunications Research Institute and Information and Communication University (ICU), Korea.

(Continued)

*Primary Examiner* — Hanh Thai
*Assistant Examiner* — Michael Le
(74) *Attorney, Agent, or Firm* — Senniger Powers LLP

(57) ABSTRACT

A method for managing a group of owned and for-purchase media items in response to a single user action. The method treats the owned media items and the for-purchase media items similarly with respect to the user's interaction with them, facilitating a user paradigm-shift from thinking about two stores of media items to a single store of media items available for use. A media item grouping generic to both types of media items is provided, permitting sharing of media item collections between users having different access rights with respect to the media items.

17 Claims, 19 Drawing Sheets

U.S. PATENT DOCUMENTS

| | | |
|---|---|---|
| 6,526,411 B1 | 2/2003 | Ward |
| 6,721,741 B1 | 4/2004 | Eyal et al. |
| 6,728,729 B1 | 4/2004 | Jawa et al. |
| 6,941,324 B2 | 9/2005 | Plastina et al. |
| 6,970,859 B1 | 11/2005 | Brechner et al. |
| 6,996,390 B2 | 2/2006 | Herley et al. |
| 7,093,296 B2 | 8/2006 | Nusser et al. |
| 7,363,278 B2 | 4/2008 | Schmelzer et al. |
| 7,376,581 B2 | 5/2008 | DeRose et al. |
| 7,383,229 B2 | 6/2008 | Jacoby |
| 7,881,315 B2 | 2/2011 | Haveson et al. |
| 2002/0041692 A1 | 4/2002 | Seto et al. |
| 2002/0055951 A1 | 5/2002 | Shigetomi et al. |
| 2002/0059584 A1 | 5/2002 | Ferman et al. |
| 2002/0099694 A1 | 7/2002 | Diamond et al. |
| 2002/0120925 A1 | 8/2002 | Logan |
| 2002/0138619 A1 | 9/2002 | Ramaley et al. |
| 2002/0146235 A1 | 10/2002 | Watanabe et al. |
| 2002/0147728 A1 | 10/2002 | Goodman et al. |
| 2002/0167947 A1 | 11/2002 | Hallford et al. |
| 2003/0023561 A1* | 1/2003 | Stefik et al. ............ 705/51 |
| 2003/0033420 A1 | 2/2003 | Eyal et al. |
| 2003/0036948 A1 | 2/2003 | Woodward et al. |
| 2003/0055818 A1 | 3/2003 | Faybishenko et al. |
| 2003/0078986 A1 | 4/2003 | Ayres |
| 2003/0110513 A1* | 6/2003 | Plourde et al. ............ 725/134 |
| 2003/0135513 A1 | 7/2003 | Quinn et al. |
| 2003/0182315 A1 | 9/2003 | Plastina et al. |
| 2003/0191776 A1* | 10/2003 | Obrador ............ 707/104.1 |
| 2003/0221541 A1 | 12/2003 | Platt |
| 2003/0236582 A1 | 12/2003 | Zamir et al. |
| 2003/0236886 A1* | 12/2003 | Oren et al. ............ 709/225 |
| 2004/0031056 A1 | 2/2004 | Wolff |
| 2004/0064476 A1 | 4/2004 | Rounds |
| 2004/0098467 A1 | 5/2004 | Dewey et al. |
| 2004/0121723 A1 | 6/2004 | Poltorak |
| 2004/0128308 A1 | 7/2004 | Obrador |
| 2004/0133923 A1 | 7/2004 | Watson et al. |
| 2004/0254659 A1 | 12/2004 | Bolas et al. |
| 2004/0260786 A1 | 12/2004 | Barile |
| 2005/0021995 A1 | 1/2005 | Lal et al. |
| 2005/0086501 A1 | 4/2005 | Woo et al. |
| 2005/0091107 A1* | 4/2005 | Blum ............ 705/14 |
| 2005/0108430 A1 | 5/2005 | Howarth et al. |
| 2005/0160042 A1 | 7/2005 | Russell et al. |
| 2005/0229225 A1 | 10/2005 | Klausberger et al. |
| 2005/0240494 A1 | 10/2005 | Cue et al. |
| 2005/0278377 A1* | 12/2005 | Mirrashidi et al. ......... 707/104.1 |
| 2006/0036554 A1 | 2/2006 | Schrock et al. |
| 2006/0048153 A1* | 3/2006 | Truong ............ 718/100 |
| 2006/0048192 A1 | 3/2006 | Averbuch |
| 2006/0053079 A1* | 3/2006 | Edmonson et al. ............ 705/59 |
| 2006/0056324 A1 | 3/2006 | Hyyppa et al. |
| 2006/0075120 A1 | 4/2006 | Smit |
| 2006/0195789 A1* | 8/2006 | Rogers et al. ............ 715/727 |
| 2006/0206727 A1 | 9/2006 | Wasson et al. |
| 2006/0242106 A1 | 10/2006 | Bank |
| 2006/0258289 A1 | 11/2006 | Dua |

FOREIGN PATENT DOCUMENTS

| | | |
|---|---|---|
| JP | 06-236251 | 8/1994 |
| JP | 11-184481 | 7/1999 |
| JP | 2000-187935 | 7/2000 |
| JP | 2002-025182 | 1/2002 |
| JP | 2002-108350 | 4/2002 |
| JP | 2003-077214 | 3/2003 |
| JP | 2003-242068 | 8/2003 |
| WO | 03023781 A1 | 3/2003 |
| WO | 2004097803 A2 | 11/2004 |
| WO | 2005/026916 A2 | 3/2005 |
| WO | 2005/073856 A2 | 8/2005 |
| WO | 2005111760 A1 | 11/2005 |
| WO | 2006093840 A2 | 9/2006 |

OTHER PUBLICATIONS

Chung, et al., Distributed Network Storage with Quality-of-Service Guarantees, http://www.isoc.org/inet99/proceedings/4q/4q_3.htm, no date, 26 pp., Carnegie Mellon University, United States.

Brunner, et al., Service Management in Multiparty Active Networks, IEEE Communications Magazine, http://www.comsoc.org/ci/private/2000/mar/pdf/Brunner.pdf, Mar. 2000, 8 pp., Columbia University, United States.

MusicMatch, MusicMatch Jukebox User's Guide, Feb. 7, 2003, Chapters A1-A6 & 1-9.

* cited by examiner

25C

25C

25D

LIKE PROCESSING OF OWNED AND FOR-PURCHASE MEDIA

CROSS-REFERENCE TO RELATED APPLICATIONS

This application is a continuation-in-part of commonly assigned U.S. patent application Ser. No. 11/202,556, filed Aug. 12, 2005, entitled "MEDIA PLAYER SERVICE LIBRARY," a continuation-in-part of commonly assigned U.S. patent application Ser. No. 11/202,900, filed Aug. 12, 2005, entitled "MEDIA PLAYER SERVICE LIBRARY," and a continuation-in-part of commonly assigned U.S. patent application Ser. No. 11/202,562, filed Aug. 12, 2005, entitled "MEDIA PLAYER SERVICE LIBRARY," the entire disclosures of which are incorporated herein by reference.

BACKGROUND

Consumers often supplement their personal collections of media items (e.g., music, video, television programming, and audio books, among others) by purchasing additional media items, in a digital format, via a network, such as the World Wide Web. For example, online retailers (e.g., FYE.com), online media sources (e.g., Microsoft Corporation's MSN® Music service), and online subscription services (e.g., Napster® and RealNetwork's Rhapsody® digital music services) have libraries of more than a million media items available to the user remotely. In the majority of these transactions, there is a normal sequence of events that must occur before the media item a user seeks to purchase is available for use, such as by burning to a compact disc (CD), ripping to a portable music player, or persistently storing the media item for use apart from the network. For example, when purchasing a song online, a user must (a) locate the song of interest from a large quantity of available songs and online stores, (b) purchase the song, (c) download the song from the network to a local device (e.g., a personal computer), and (d) sync the downloaded song to the preferred final destination (e.g., a portable music player). In other words, the conventional process often involves multiple and sometimes tedious steps of locating, purchasing, and downloading the media as occurring both separately and before syncing the song to the preferred final destination.

Users tend to regard their collections of media items as coming from two, separate sources, namely a local library of media items that the user currently owns rights to and a store/subscription service of media items to which access may be obtained for payment. With conventional systems, the collection and manipulation of media items accessible from the two sources is accomplished with completely separate processes. For example, as user wishing to burn a CD with five songs from their local library and ten other songs from a store/subscription service, would first need to locate, purchase, and download each of the ten new songs from the store/subscription service. Once this process is complete, the user would then locate each of the five songs originally in the local library and the ten recent additions to the local library for burning the CD. This process for persistently storing the media items has several steps and requires ability in both online purchasing techniques and file management on a local device. For the knowledgeable user, this process is manageable, but requires several steps requiring human control and intervention. But many less-skilled users are simply not capable of performing these multiple tasks requiring knowledge and skill for multiple user interfaces and methods. A way to provide users with the ability to treat available media, whether owned or available for purchase, similarly in a single user interface would be useful. Moreover, a way to provide a means for initiating generation of a group of owned and for-purchase media items in response to a single action being performed by the user would be useful.

Moreover, users often wish to share their artistic preferences with others, such as by providing access to a user-generated playlist. A second user attempting to enjoy that playlist, however, may be unable to listen to each media item because he lacks the rights to access each of the media items. For example, the user may only be able to enjoy the media items accessible from the playlist already stored in his local library. Moreover, even if the second user has rights to the other media items (e.g., via a subscription service), he may be unable to readily access those media items via the playlist because the playlist is unable to provide the correct link to the streaming version of the media item on the subscription service. The second user may be required to translate the playlist to a form that cooperates with his media item access rights. In other words, the effective sharing of playlists can be complicated. Thus, a way to provide a universal playlist whereby any user could enjoy the playlist to the full extent of his access rights by providing appropriate links to potential sources for each of the media items, including partial samples of media items to which the user has no present access, would be useful.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, aspects of the invention provide for managing a group of owned and for-purchase media items in response to a single user action. By treating the owned media items and the for-purchase media items similarly with respect to the user's interaction with them, aspects of the invention facilitate a user paradigm-shift from thinking about two stores of media items to a single store of media items available for use. By providing a media item grouping that is generic with respect to the source of each of the media items, aspects of the invention permit sharing of media item collections between users having different access rights with respect to the media items.

BRIEF DESCRIPTION OF THE DRAWINGS

Corresponding reference characters indicate corresponding parts throughout the drawings.

DETAILED DESCRIPTION

As discussed above in the Background, the management of media items owned by a user and those accessible to a user remotely (e.g., available via subscription or for purchase via a network) can be complex. Media items may include, but are not limited to, media files of multiple formats, such as music, speeches, audio books, news reports, movies, movie trailers, audio blogs, radio stations, television shows, images, and comedy routines, among others. Because of this complexity of managing numerous media items, users often think of their local library of media items as being separate from the store/subscription service, where they may have access to many additional media items. This thinking has developed over time as users have become accustomed to working with media items in their local library differently that they work with media items in a store/subscription service. By providing users with a more integrated process, whereby media items located in various locations and according to various access schemes may be acted upon as if they are within the local library, this paradigm can be transformed. With more integration between owned, subscription, and for-purchase media, users will begin to see all available media items as ready-for-use with one another, without a myriad of intervening steps.

Exemplary Computing Environment

Figure 1:
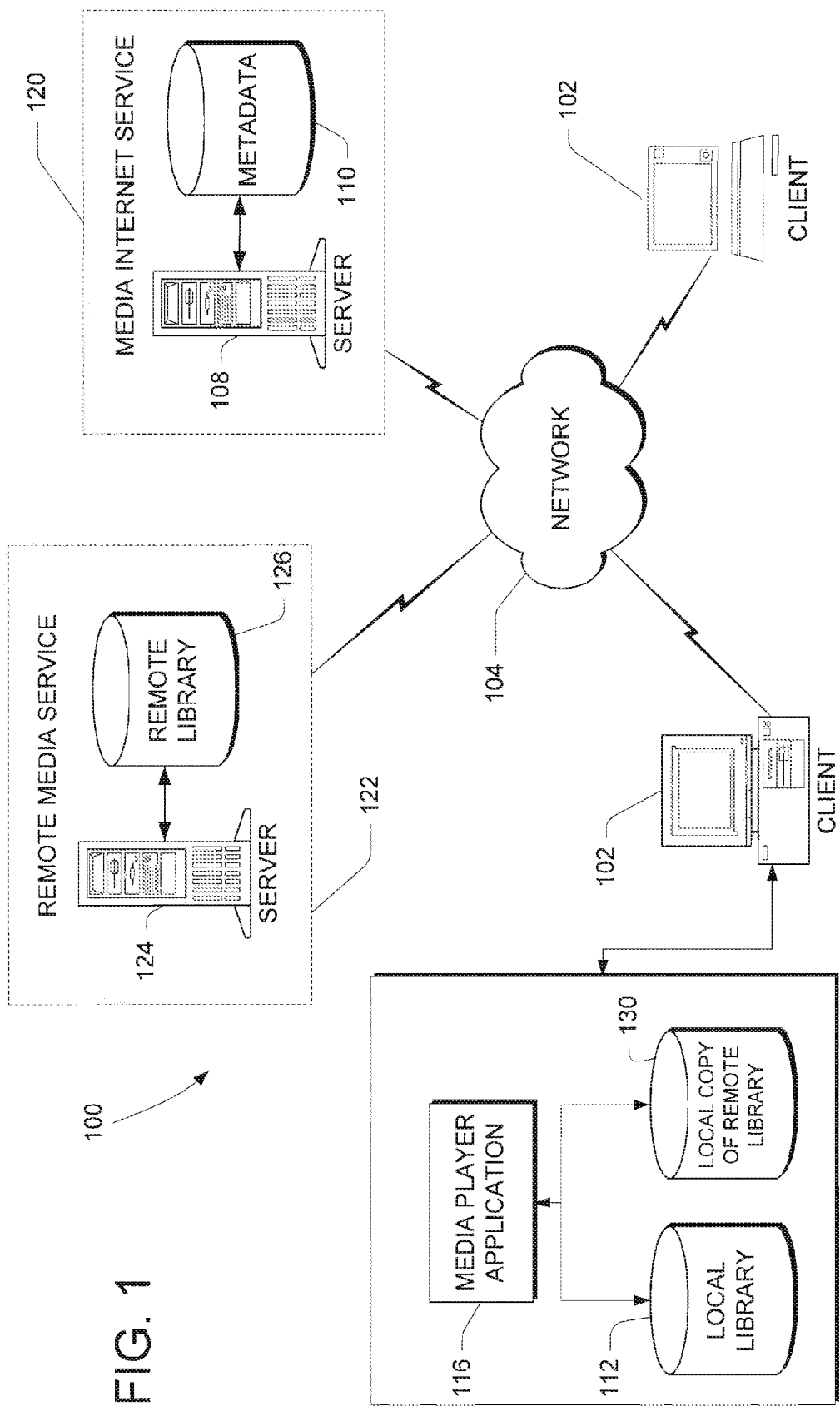
FIG. 1 is a block diagram illustrating components of an exemplary computer system implementing an embodiment of the invention

Referring now to the drawings, FIG. 1 illustrates an exemplary computing environment in which the present invention may be implemented for enhancing user media playing experience. A media player system 100 includes one or more client computers 102 coupled to a data communication network 104. One or more server computers 108 may also be coupled to the network 104. As shown in FIG. 1, the system 100 also includes one or more databases 110 associated with server 108.

In one embodiment, the computer 102 accesses the server 108 (and the information in the database 110) via network 104. As an example, network 104 is the Internet (or the World Wide Web) but the teachings of the present invention may be applied to any data communication network. Server 108 and computer 102 communicate in the illustrated embodiment using, for example, the hypertext transfer protocol (HTTP).

Aspects of the invention provide software routines that, when executed by a computer, render media content and retrieve, store, and display contextual information. Referring further to FIG. 1, the user's computer 102 accesses one or more digital media files stored in the form of a local media library 112. The local media library 112 may reside on the computer's hard drive, a removable computer-readable storage medium, or the like. In the illustrated embodiment, computer 102 executes a media player application 116 for rendering selected media files. The media player application 116 may be any suitable media player that is configured to play digital media so that a user can experience the content that is embodied on the media. For example, a media player application embodying aspects of the invention may be built on Microsoft Corporation's Windows Media™ Player program.

The media player application 116 may be configured to communicate with server 108 and its associated database 110 via network 104 to access data stored in database 110. In this instance, server 108 and database 110 constitute a media internet services site 120 that enables the user to access, retrieve, and display so-called metadata. In particular, this aspect of the invention enables media player application 116 to access, retrieve, and display metadata in conjunction with rendering media content. Those skilled in the art are familiar with metadata, which is simply information about data. In the context of the present invention, metadata includes information related to specific content of a digital media file being rendered by the media player application 116. Basic metadata includes title, composer, performer, genre, description of content, and the like. Extended metadata includes cover art, performer biographies, reviews, related performers, where to buy similar items, upcoming concerts, ticket sales, URLs (Uniform Resource Locators) to other related experiences including purchase opportunities, and the like.

In the embodiment of FIG. 1, server 108 matches the metadata stored in database 110 to the specific media content that is being experienced by the user. Server 108 then returns the metadata to the user's computer 102. In many of the examples herein, media content is described in the context of music content stored in the client computer's memory for convenience. It is to be appreciated and understood that the media content may be embodied on any suitable media, including digital files downloaded to the local memory of client computer 102 or accessible by computer 102 via network 104. The media content may include, without limitation, specially encoded media content in the form of, for example, an encoded media file such as media content encoded in Microsoft® Windows Media™ format using the Microsoft® Windows Media™ Player program.

The system 100 of FIG. 1 permits the user to render a media file on an enabled media playing device (e.g., computer 102 running Microsoft® Windows® operating system and Windows Media™ Player program) and expect not only to experience the media content but also have access to all manner of related metadata. In addition, the user community has the ability to contribute key information such as community ratings to the process to improve the experience for other users.

Aspects of the invention also include communication between the media player application 116 executed on computer 102 with one or more remote media services 122. The remote media service 122 may be, for example, an online retailer (e.g., FYE.com), an online media source (e.g., Microsoft Corporation's MSN® Music service), or an online subscription service (e.g., Napster® and RealNetwork's Rhapsody® digital music services). In one embodiment, remote media service 122 utilizes one or more servers for maintaining a catalog of available media files, that is, a remote media library 126, or remote media store. Those skilled in the art are familiar with such services from which a user may download music files and/or listen to songs directly via the Internet, usually for a monthly subscription price or on a per-song basis. For example, the remote media library 126 contains the inventory of an online media provider.

The exemplary operating environment illustrated in FIG. 1 includes a general purpose computing device (e.g., computing device 102) such as a computer executing computer-executable instructions. The computing device typically has at least some form of computer readable media. Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. A user may enter commands and information into the computing device through input devices or user interface selection devices such as a keyboard and a pointing device (e.g., a mouse, trackball, pen, or touch pad). Other input devices (not shown) may be connected to the computing device. A monitor or other type of display device (not shown) is also connected to the computing device. In addition to the monitor, computers often include other peripheral output devices (not shown) such as a printer and speakers, which may be connected through an output peripheral interface (not shown).

The computer 102 may operate in a networked environment using logical connections to one or more remote computers. The remote computer may be a personal computer, a server (e.g., servers 108, 124), a router, a network PC, a peer device or other common network node, and typically includes many or all of the elements described above relative to computer 102. Such networking environments are commonplace in offices, enterprise-wide computer networks, intranets, and global computer networks (e.g., the Internet).

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

Referring further to FIG. 1, embodiments of the invention provide a relatively seamless user experience by which a user of computer 102 can manage local media (i.e., local library 112) and remotely accessible media (i.e., remote media library 126). In one aspect, the user may consider both local and remote media libraries as part a personal collection while retaining a clear understanding of what is local versus what is remote. Embodiments of the invention provide user-friendly, content-driven access to complex remote data sources such as remote media library 126 with the benefits of a local user experience (e.g., responsive behaviors such as searching and sorting; rich user experience constructs such as "word wheeling", searching, sorting, large list scrolling, alternate views, and context menus; and local storage for offline use). Moreover, aspects of the invention may be applied to various forms of digital media, including audio files (e.g., music tracks, news reports, audio web logs, audio books, speeches, comedy routines, etc.), video and multimedia files (e.g., movies, movie trailers, television shows, etc.), and images. In addition, aspects of the invention may also be applied to physical libraries of traditional, non-digital media items such as books, physical DVD collections, and the like. One aspect of the invention further relates to a local copy 130 of the remote library 126 maintained by computer 102. In one embodiment, the local copy 130 is a compressed database or catalog representative of the remote media files accessible by computer 102 from the remote media service 122. A relatively heavy compression of the typically large remote library 126 permits local storage. One exemplary compression technique provides compression of about 1.2 million tracks of metadata to be fit into about 20 Mbytes of storage.

In one embodiment, media player system 100 implements an integrated media library system. As described above, computer 102 executes media player application 116 for rendering one or more media files. In this instance, local library 112, which may be stored on the hard drive of computer 102 or a removable storage device associated with the computer, contains one or more media files. In addition, remote media library 126 contains one or more media files. Although library 126 is remote from computer 102, its media files are accessible by media player application 116 via network 104. A user interface (e.g., see FIGS. 4-18) displays information representative of both local library 112 and remote media library 126. The media player application 116 is responsive to user input via the user interface for performing one or more media player operations on either local library 112 or remote media library 126 or both.

Typical media player operations include, for example: displaying metadata associated with the media files; rendering, copying, or downloading selected media files; persistently storing (burning, copying, etc.) media items to a memory (e.g., a CD), synchronizing media items and/or metadata with another device (e.g., a portable media device), rendering samples of selected media files; assigning media files to one or more playlists; sharing such playlists with other users and other devices (e.g., video game consoles, portable media devices, etc.) searching or sorting the media files according to their metadata or content; displaying media library contents; scrolling through the media library contents; and displaying contextual menus of available media player operations.

Methods for Like Processing of Owned and Purchased Media

Figure 2:
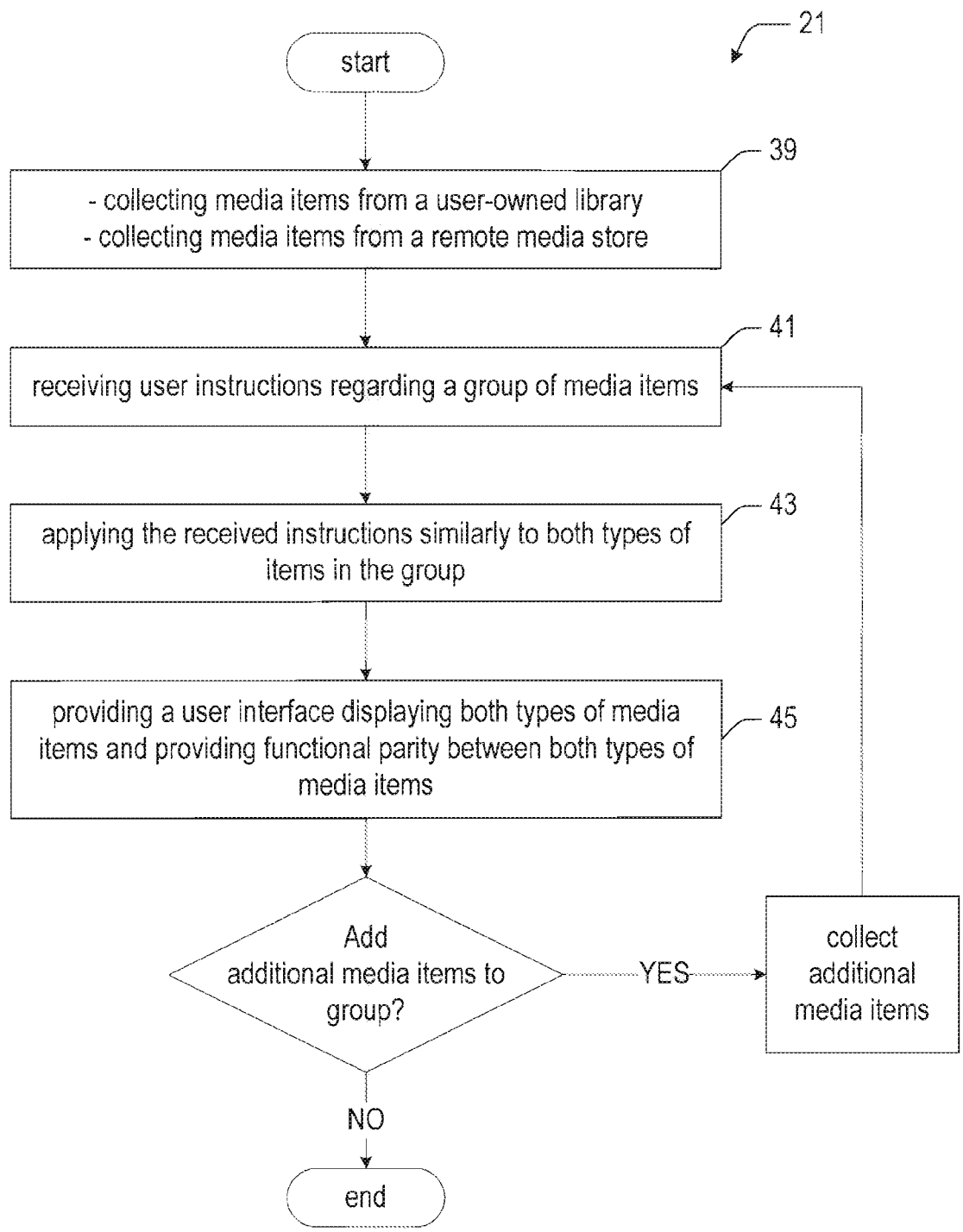
FIG. 2 is a flow diagram of a method of one embodiment of the invention.

To this end, a computer-implemented method for providing services to a user related to a group of at least two media items is generally indicated at 21 in FIG. 2. The media items are adapted for rendering to the user by a media player application 116 executed by a computing device 102 coupled to a data communication network 104, as described above with reference to FIG. 1.

Figure 4:
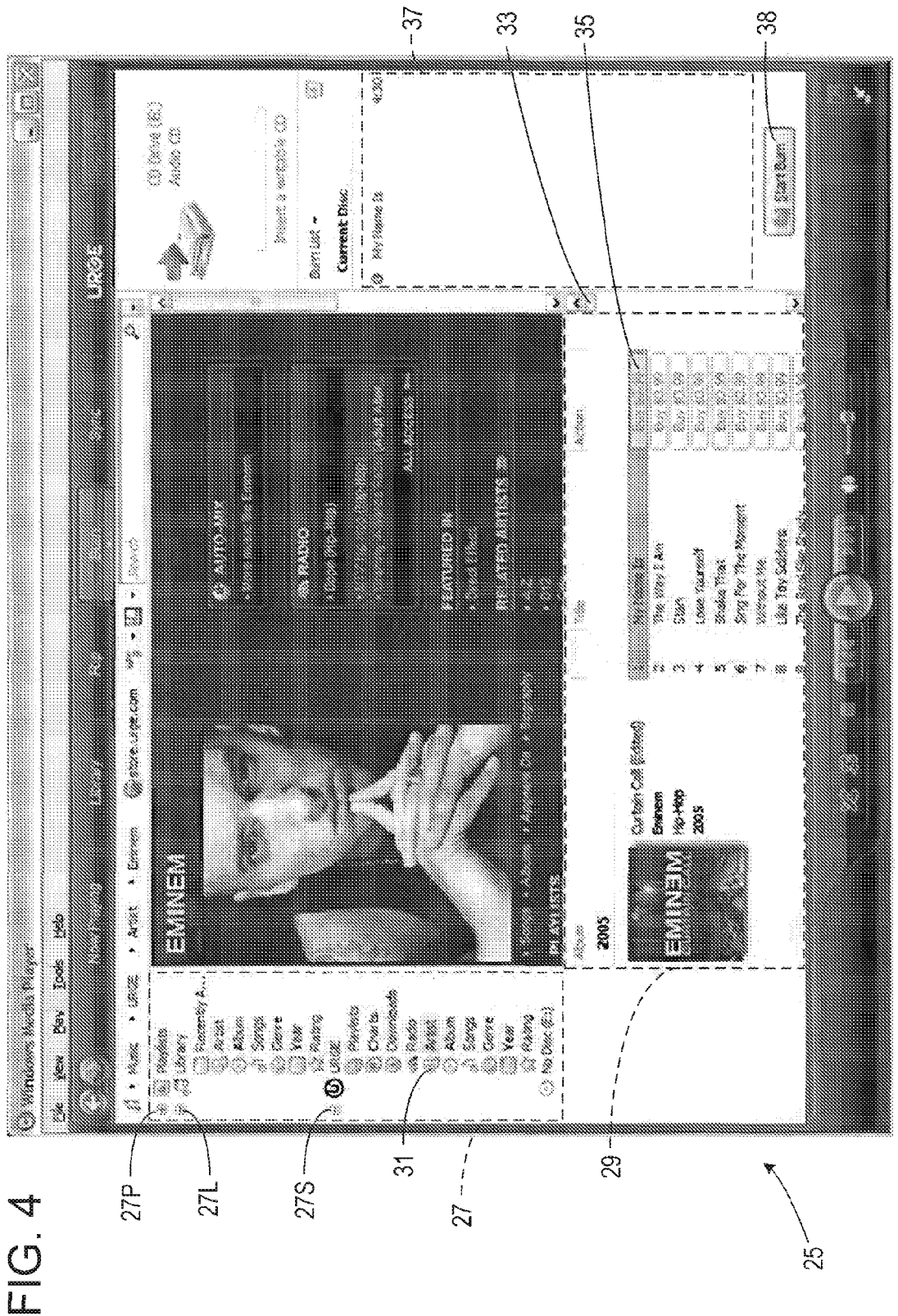
FIGS. 4-18 are photographs of screen shots of exemplary user interfaces illustrating aspects of the invention.

Throughout the description of the method 21, reference will be made to the exemplary user interfaces of FIGS. 4-18, as examples of some features of the method. Reference to these user interfaces is exemplary only, and should not be construed as further defining the methods discussed herein. Referring now to FIG. 4, a user interface, generally indicated 25, comprises a directory tree 27 with three main trunks, a playlist trunk 27P, a library trunk 27L, and a music subscription service trunk 27S. The playlist trunk 27P provides access to user playlists, the library trunk 27L provides access to media items currently stored in a user-owned library (e.g., local library 112), and the music store trunk 27S provides access to media items located in a remote media store (e.g., remote media library 126) containing one or more media items accessible by the computer 102 via a network 104 (e.g. media items available for purchase), or for use under the terms of a music subscription service. The directory tree 27 may include other trunks and/or branches adapted for providing access to other sources of media items, without departing from the scope of the invention. Moreover, the trunks and branches depicted in this figure, and all other figures, may be modified without departing from the scope of the invention.

The user interface 25 further comprises a display area 29 displaying information related to the media items currently under review by the user. In the example shown, the user has selected an artist branch 31 of the music subscription service trunk 27S, and further has selected "Eminem" as the artist to review. The display area 29 includes a listing of all albums by "Eminem" available through the store, and includes a scroll bar 33 for scrolling through the multiple albums in the display area. In the example shown, the album listed is "Curtain Call (edited)," and various pieces of metadata related to the album are listed (e.g., cover art, album title, artist, genre, release year, track number, and track name). In addition to this metadata, an indicator 35 appears adjacent each track name indicating the accessibility status of the track. In the example shown, each indicator 35 associated with the tracks of the "Curtain Call (edited)" album shows a "Buy $0.99" indicator, indicating both that the tracks are available for purchase and that they are not available to the user via another source (e.g., a user-owned library 112). In this example, each indicator 35 also functions as a selection element for selecting a particular track for purchase. The user interface 25 additionally includes a group basket 37 adapted for collecting media items accessible from both the user-owned library 112 and the remote media store 126. In the example shown, the user has placed a track entitled "My Name Is" from the "Curtain Call (edited)" album into the group basket 37.

Figure 5:
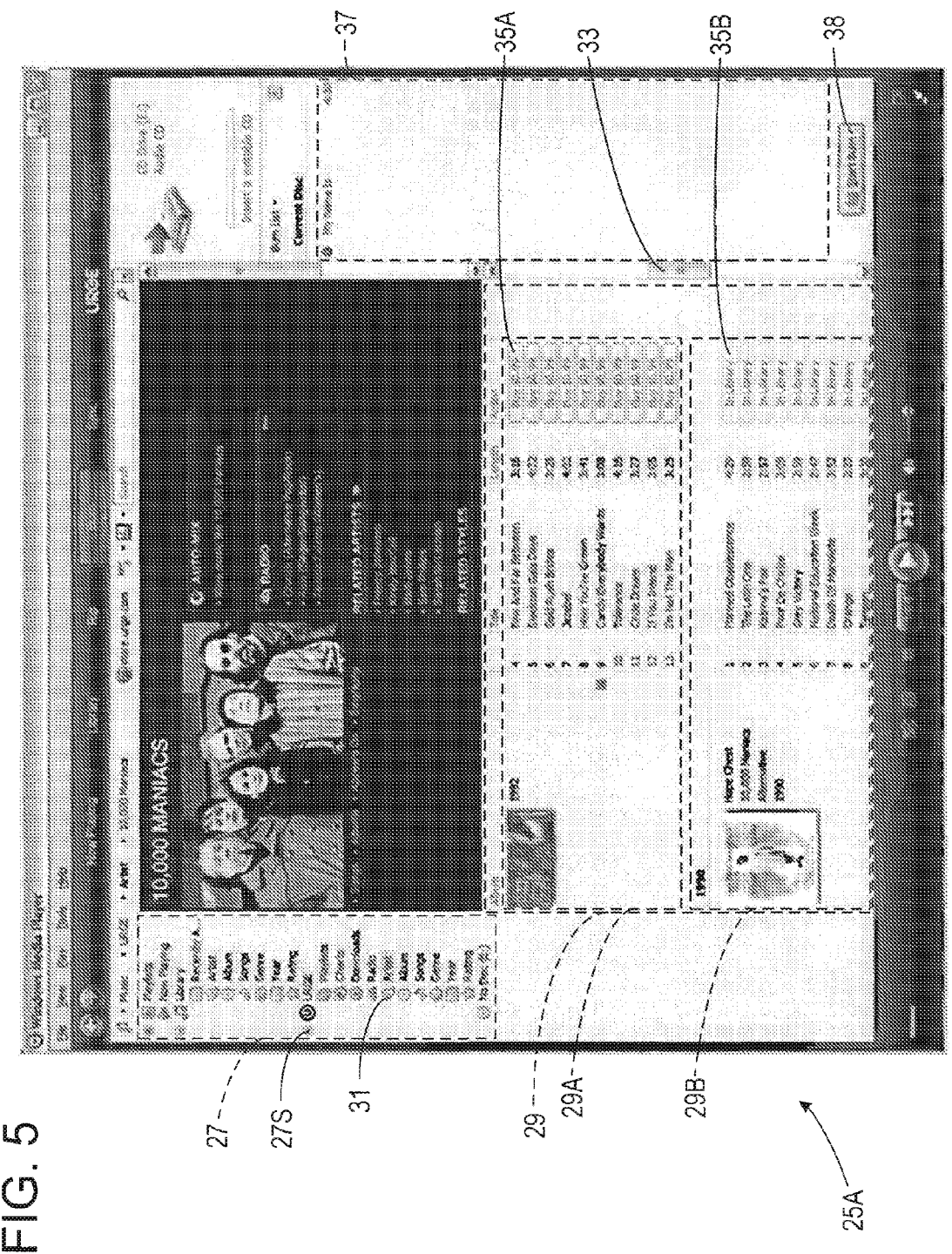
Figure 6:
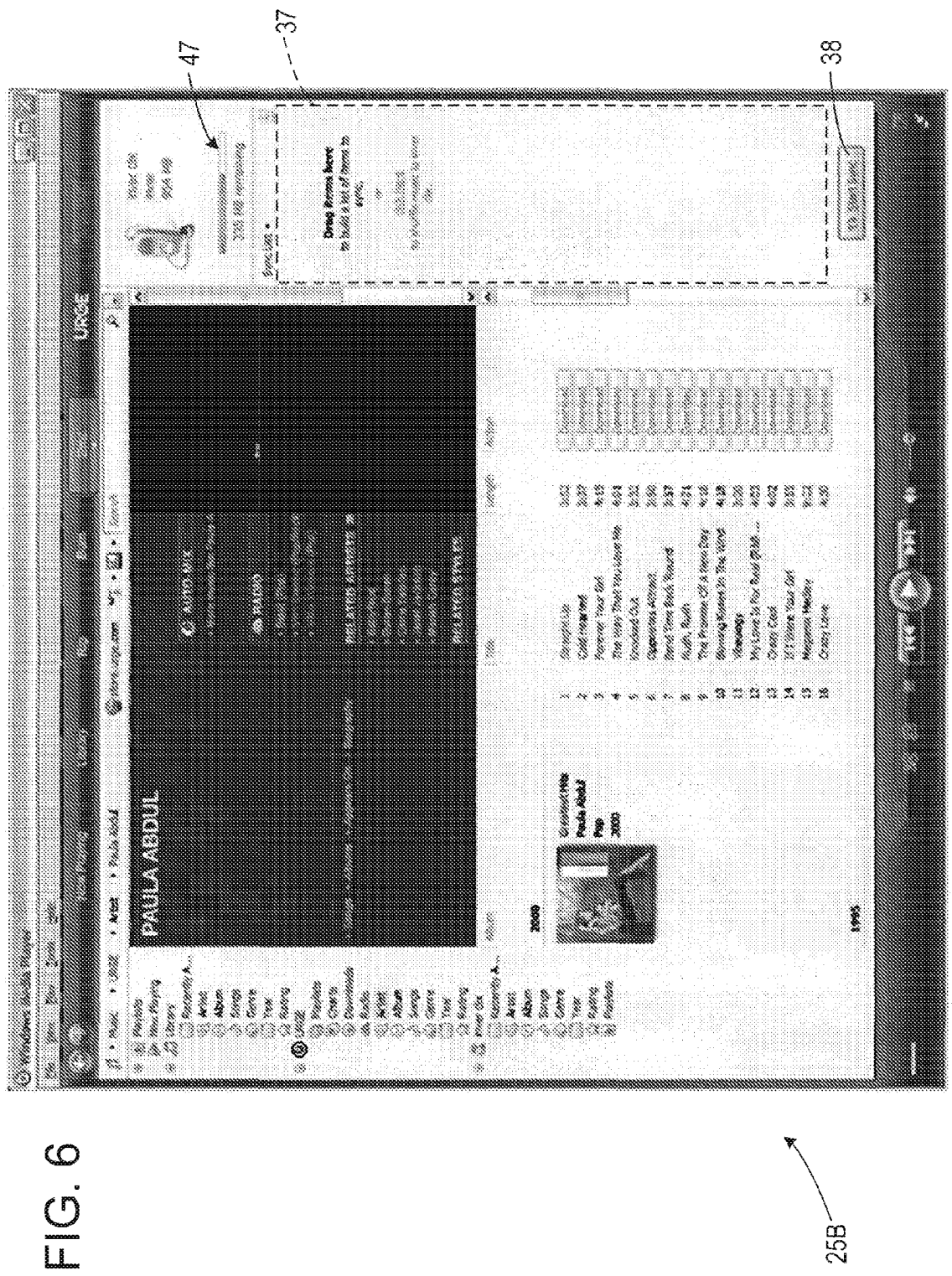

Turning to FIG. 5, another user interface, generally indicated 25A, similar to the user interface 25 of FIG. 4, is depicted. Here, the interface also includes a directory tree 27, a display area 29, and a group basket 37, generally as set forth above. In this example, the user has selected an artist branch 31 of the music subscription service trunk 27S, and further has selected "10,000 Maniacs" as the artist to review. The display area 29 includes a listing of all albums by 10,000 Maniacs available through the store, and includes a scroll bar 33 for scrolling through the multiple albums in the display area, generally as set forth above. In the example shown, two albums are listed in the display area 29, including sub-area 29A for the album "Our Time in Eden" and sub-area 29B for the album "Hope Chest". As above, various pieces of metadata related to the albums are listed.

In addition to this metadata, an indicator 35 appears adjacent each track name indicating the accessibility status of the track. In the example shown, each indicator 35 associated with the tracks of the "Our Time in Eden" album shows a "Buy $0.99" indicator 35A, indicating both that the tracks are available for purchase and that they are not available to the user via another source (e.g., a user-owned library). In contrast, each indicator 35 associated with the tracks of the "Hope Chest" album shows an "In Library" indicator 35B, indicating that the tracks are already in the user's library (e.g., a user-owned library). Although here the exemplary indicators 35A, 35B are grouped by album, it should be understood that tracks from the same album may also include different indicators (e.g., indicating some tracks from the album are in a user-owned library while other tracks are available for purchase).

The user interfaces 25, 25A of FIGS. 4 and 5 further comprise a selection element 38 adapted for burning the media items collected in the group basket 37 to at least one of a CD, a disc drive, a flash memory, a DVD (digital video disc), a USB (universal serial bus) drive, a portable media device, and a game console, among others. As will be discussed in greater detail below, by selecting this single selection element 38, the user can initiate the burning, or other persistent storing, of both user-owned and to-be-purchased media items. This single selection, therefore, purchases, downloads, and burns the to-be-purchased media items collected 39 by the user in the group basket 37 with those user-owned items also collected in the group basket. As would be readily understood by one skilled in the art, the depicted selection element adapted for initiating a burning process may also be adapted to initiate any process for persistently storing the media item group, and or media items, collected in the group basket 37. The selection element for burning is but one option for persistently storing such a media item group. Other features of the user interfaces 25, 25A will be described in greater detail below, as required.

Returning to the method 21 of FIG. 2, the method provides services to a user related to a group of at least two media items. In particular, the method 21 comprises receiving, at 41, instructions from a user regarding the group of media items. At least one of the media items in the group is collected, at 39, from a user-owned library 112 of media items containing one or more media items owned by the user. At least one other of the media items in the group is collected, also at 39, from a remote media store 126 containing one or more media items accessible by the computer 102 via the network 104 and available for purchase. The instructions received 41 may include a wide variety of instructions, including, for example, generating a playlist of media items including those in the group, burning a CD with the media items included in the group, and persistently storing the media item group and/or the media items in the group.

The method 21 also comprises applying, at 43, the received instructions to the group of at least two media items. The received instructions are applied 43 similarly to the media items collected from a user-owned library 112 of media items and to the media items collected from the remote media store 126 of media items available for purchase. This similar application 43 of instructions provides the user with a unique user experience, whereby the user may issue a single set of instructions for application to both owned media items and those media items not yet owned by the user.

The method further provides, at 45, a user interface (e.g., user interfaces 25 and 25A) on the computing device 102 that displays both the media items accessible from the user-owned library and the media items accessible from the remote media store in an integrated display. The provided user interface 25, 25A is adapted to provide functional parity between media items accessible from the user-owned library 112 and media items from the remote media store 126 within the user interface. In one embodiment, the providing 45 a user interface comprises providing, also at 45, a directory tree (e.g. directory tree 27) wherein one branch provides access to the user-owned library 112 (e.g., a library trunk 27L) and another branch provides access to the remote media store 126 (e.g., a music subscription service trunk 27S).

In addition, the providing 45 a user interface further comprises providing, also at 45, a display area (e.g., display area 29) for simultaneous display of media items stored in the user-owned library 112 and media items stored in the remote media store 126 available for purchase (e.g., sub-area 29A and sub-area 29B). The providing 45 a user interface also comprises providing, also at 45, an indicator 35 in the display area 29 corresponding to each media item for indicating whether the corresponding media item is either stored in the user-owned library 112 (e.g., an "In Library" indicator 35B) or accessible from the remote media store 126 (e.g., a "Buy $0.99" indicator 35A). In the examples depicted in FIGS. 4 and 5, the provided indicators 35 may further comprise providing a selection element, also referenced 35, in the display area 29 associated with each indicator for selectively purchasing the media items, via the network 104. By selecting the selection element 35 associated with a particular track, the user authorizes the media player application 116 to purchase the media item for the user-owned library 112.

The providing 45 a user interface 25, 25A of the method 21 may further comprise providing, also at 45, a group basket 37 adapted for collection of media items accessible from both the user-owned library 112 and the remote media store 126. The basket 37 is useful for collection and organization of media items from both the user-owned library 112 and the remote media store 126. The method 21 further comprises providing, also at 45, a selection element 38 adapted for burning the media items collected in the group basket 37 to at least one of a CD, a disc drive, a flash memory, a DVD, a USB drive, a portable media device, and a game console. As would be readily understood by one skilled in the art, the providing a selection element may more generally comprise providing a selection element adapted for persistently storing the media item group and/or media items collected in the group basket 37. The selection element for burning is but one exemplary option for persistently storing such a media item group and/or media items.

Referring now to the user interfaces 25B of FIGS. 6-9, another feature of the present method 21 is introduced. In particular, the user interface 25B includes a display, generally indicated 47, of the available memory space for stored media items on the device currently selected as the burn, or persistent store or synchronization, destination for selection element 38. The display 47 functions as follows. In the user interface 25B of FIG. 6, the group basket 37 is empty, as the user has not selected any media items for inclusion in the group basket. As such, the display 47 indicates that the destination memory, here an "iriver clix," has 335 MB (megabytes) of storage space available. A progress bar associated with the display 47 indicated that approximately two-thirds of the memory of the destination memory is used, while approximately one third, or exactly 335 MB, is available for further storage.

Figure 7:
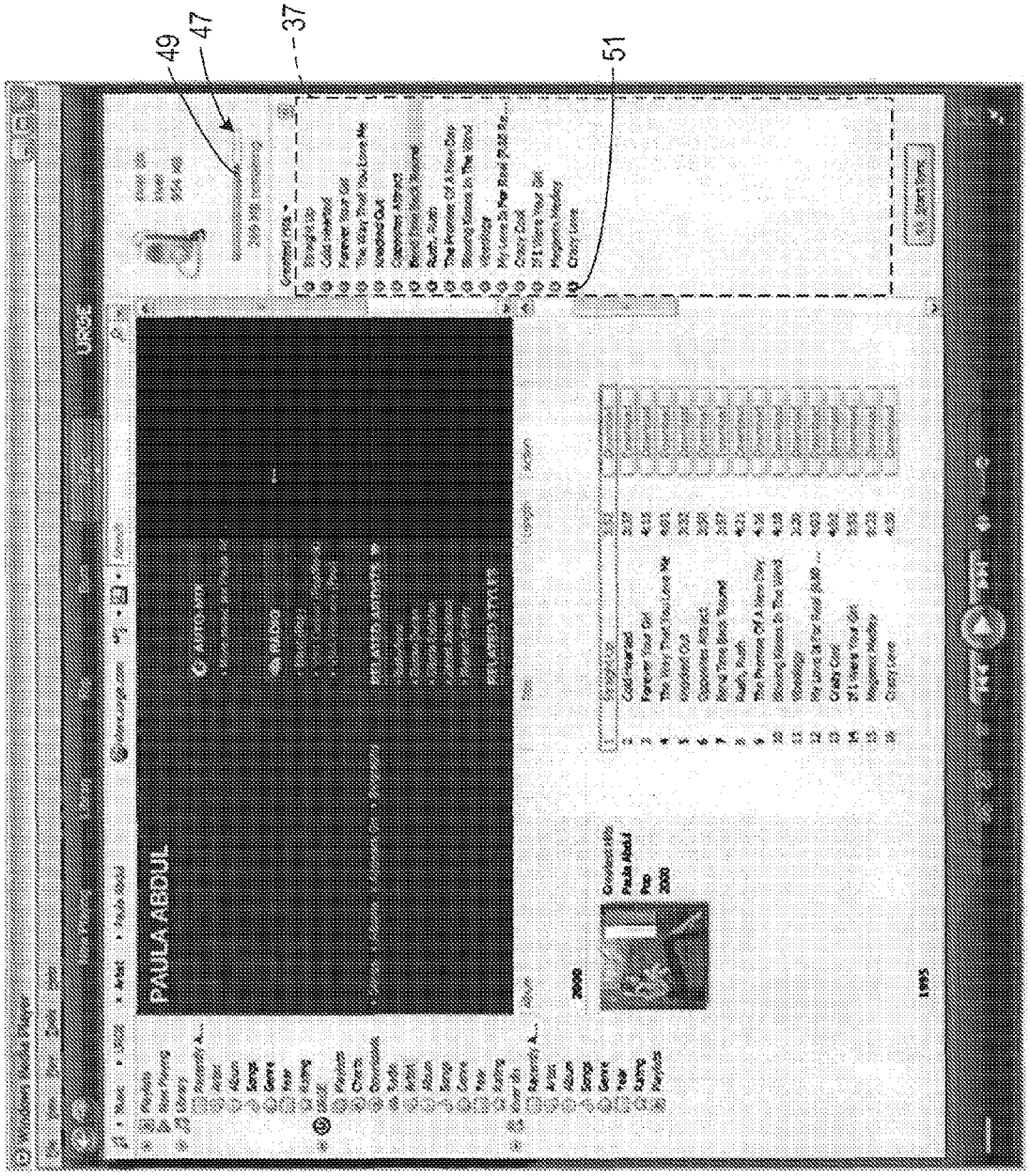
Figure 8:
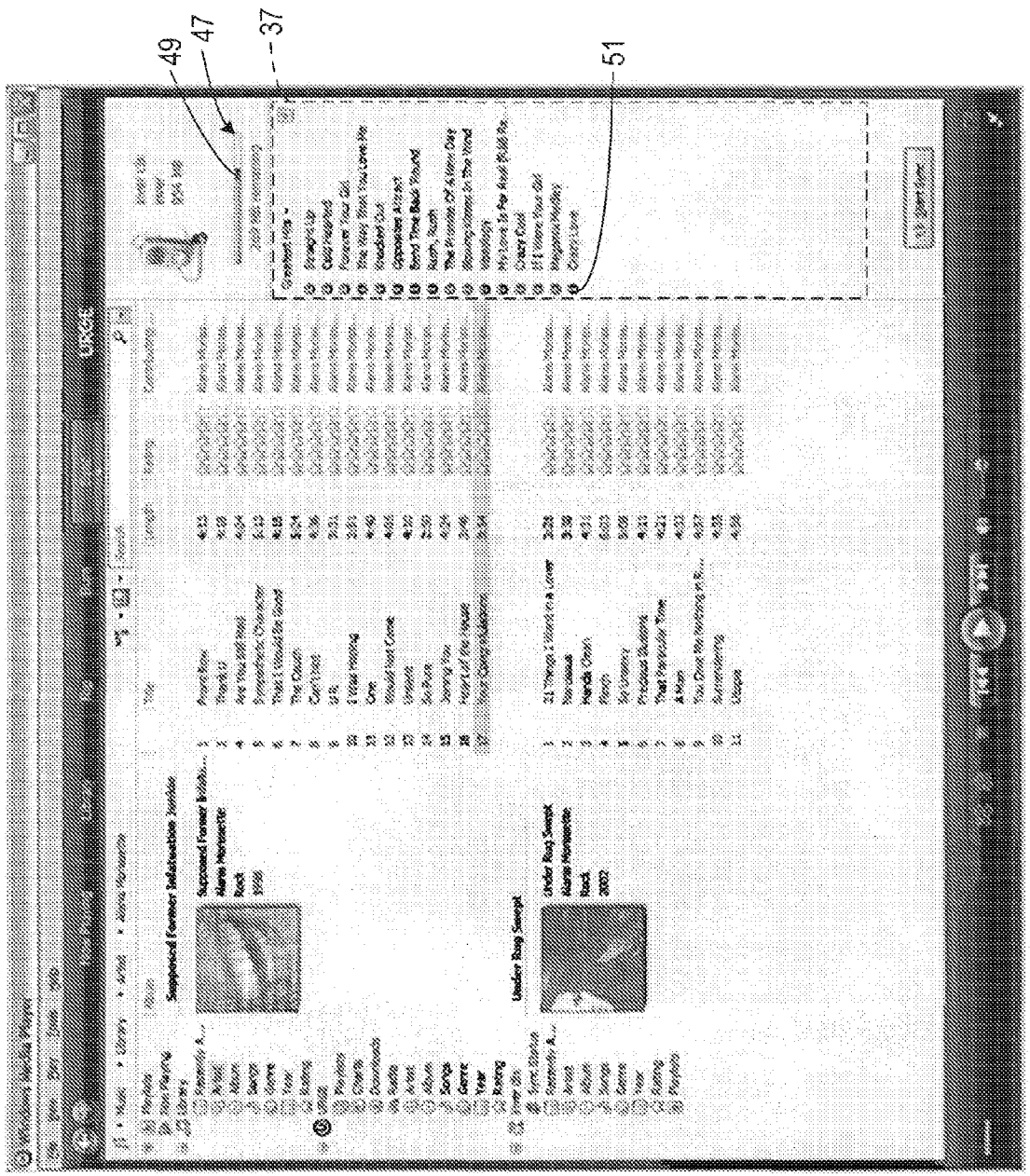
Figure 9:
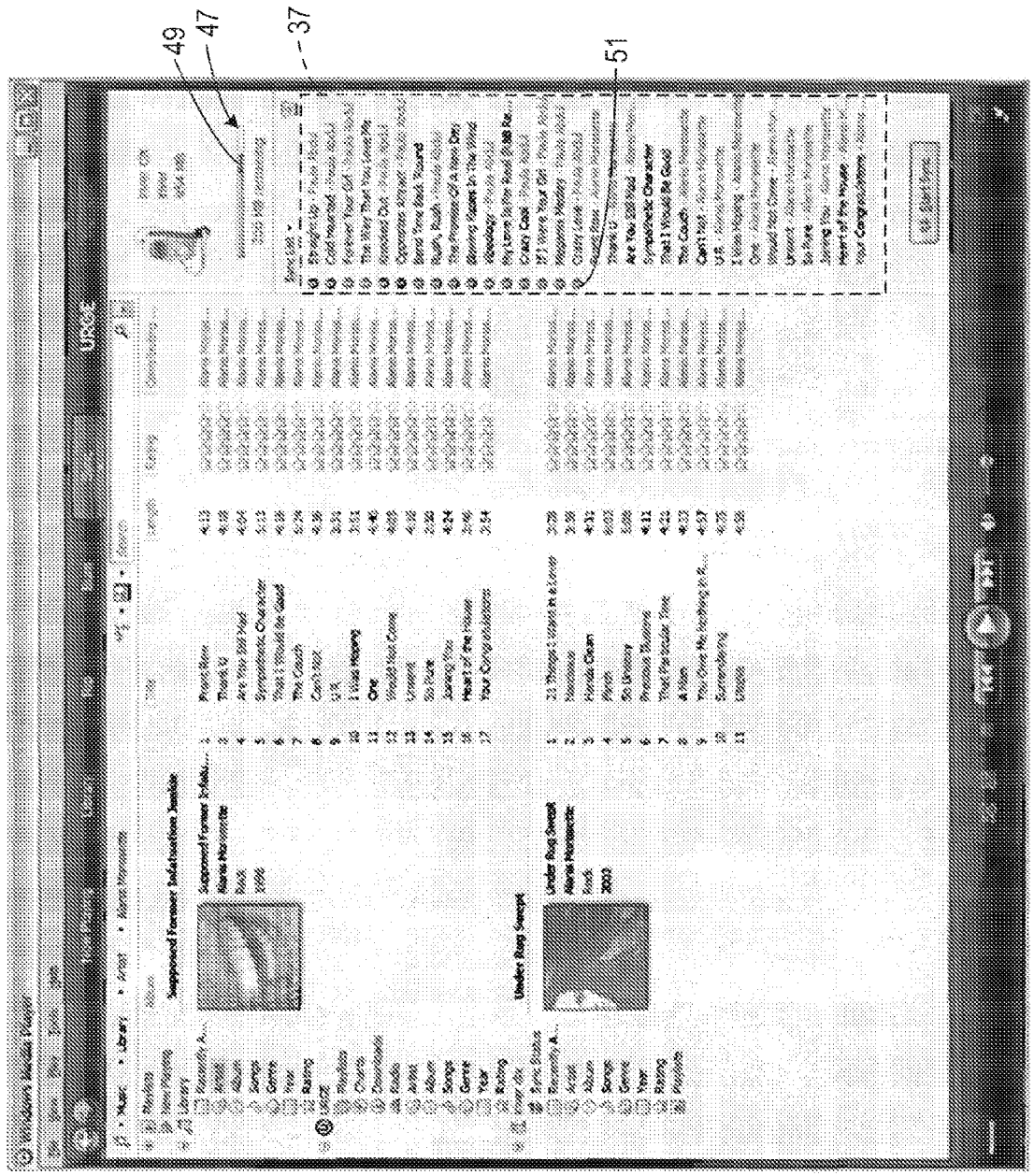

Turning to FIGS. 7 and 8, the user interface 25B indicates that sixteen additional media items have been placed into the group basket 37. Thus, the progress bar associated with the display 47 is updated to include a memory projection bar 49 demonstrating the additional memory required to store the media items included in the group basket 37. Referring now to FIG. 9, the user has placed an additional 16 media items into the group basket 37. Thus, the progress bar associated with the display 47 is further updated to increase the size of the memory projection bar 49, thereby demonstrating the further additional memory required to store the new media items included in the group basket 37. In addition to providing the memory projection bar 49, the user interface 25B may further comprise an indicator 51 (see FIGS. 7, 8, and 9) in the group basket 37 for each of the media items accessible from the remote media store 126, rather than the local library 112. This indicator 51 associated with each media item provides a ready reference to the user regarding which of the collected 39 media items must be purchased, while those without the indicator need not be purchased.

Returning to the method 21 of FIG. 2, the providing 45 a user interface 25B additionally comprises providing, also at 45, a display (e.g., display 47) of the available memory space for stored media items on the at least one of a CD, a disc drive, a flash memory, a DVD, a USB drive, portable media device, and a game console associated with synchronization of the group basket 37 of media items. The providing 45 a user interface 25B additionally comprises providing, also at 45, the display 47 of the memory space required for the media items collected in the group basket as a portion of the display of available memory space for stored media items (e.g., memory projection bar 49) on the CD, the disc drive, the flash memory, the DVD, the USB drive, the portable media device, and the game console. Moreover, the providing 45 a user interface 25B may further comprise providing an indicator 51 in the group basket 37 for each of the media items accessible from the remote media store indicating that such media items are available for purchase from the remote media store 126, rather than the user-owned library 112.

In operation, computer 102 executes a computer-implemented method of operation on one or more data processing devices such as described above for providing, by a computer, services to a user related to a group of at least two media items adapted for rendering to the user by a media player application 116. The media player application is executed by a computing device 102 coupled to a data communication network 104. At least one of the media items is collected from a user-owned library 112 containing one or more media items owned by the user, and at least one of the media items is collected from a remote media store 126 containing one or more media items accessible via the network 104. The computer 102 (or its components) receives instructions from a user regarding the group of at least two media items. The computer 102 (or its components) applies the received instructions similarly to the media items collected from the user-owned library 112 of media items and to the media items collected from the remote media store 126. The computer 102 (or its components) provides a user interface on the computing device 102 that displays both the media items accessible from the user-owned library 112 and the media items accessible from the remote media store 126 in an integrated display, whereby the user interface provides functional parity between media items accessible from the user-owned library and media items accessible from the remote media store within the user interface.

Methods for Managing a Group of Media Items

Figure 3:
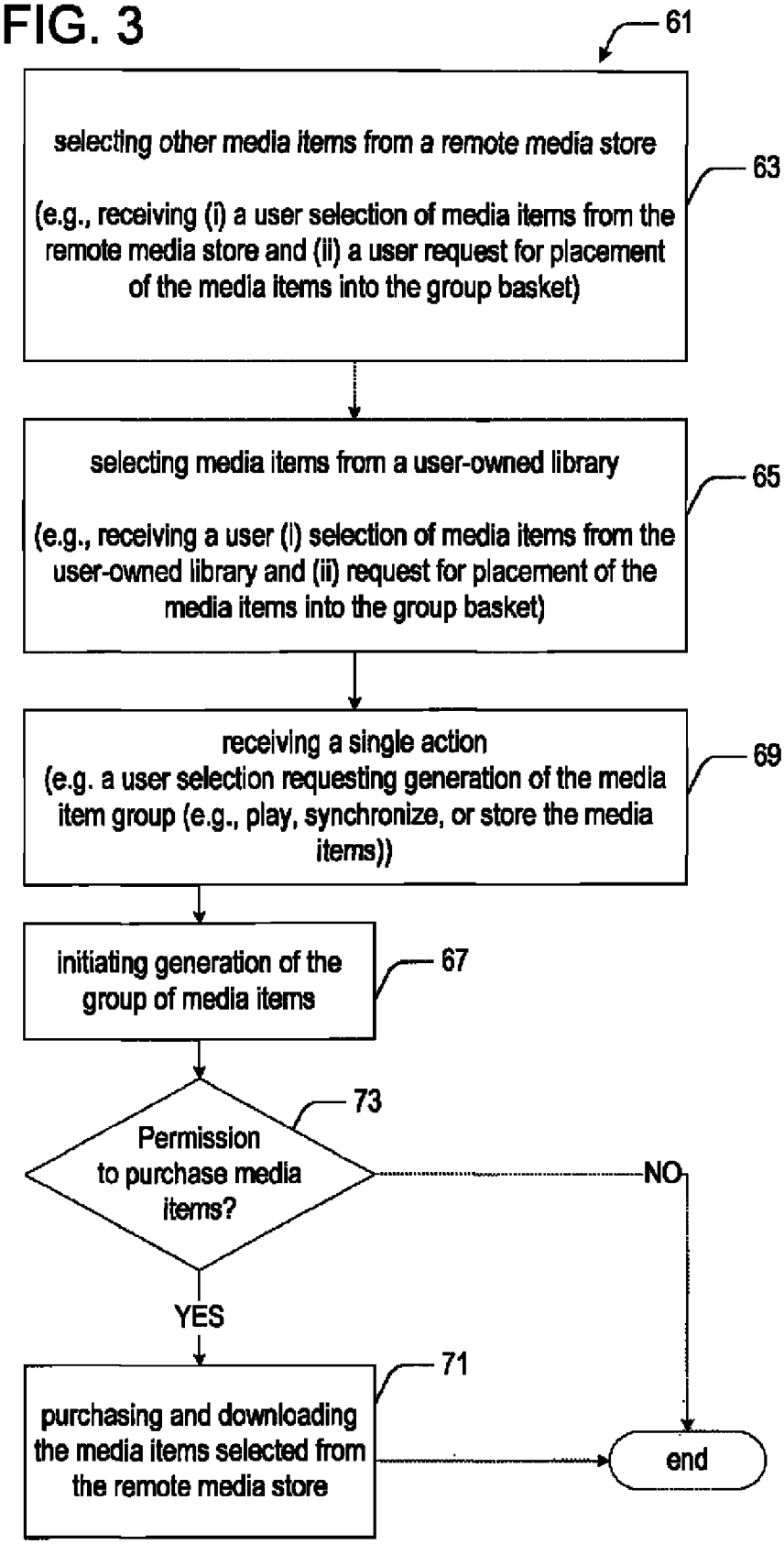
FIG. 3 is a flow diagram of a method of another embodiment of the invention.

A computer-implemented method for managing media items with a computing device 102 coupled to a data communication network 104 is generally indicated 61 in FIG. 3. As discussed above, the computing device 102 executes a media player application 116 for rendering one or more of the media items to a user.

According to this method 61, at least one of the media items in the group is collected from a user-owned library 112 of media items (e.g., digital music files copied from music CDs and stored to a hard drive memory, media items stored remotely but to which the user already has access rights, etc.). In addition, at least one other media item of the group of media items is collected from a remote media store 126 (e.g., subscription service) containing one or more media items available for purchase and accessible by the computing device 102 via the network 104 (e.g., a music subscription service with streaming music downloads).

The method comprises selecting, at 63, at least one other media item from the remote media store 126 of media items. In one example, the selecting 63 comprises receiving, also at 63, a user selection of the at least one media item from the remote media store 126 and receiving a user selection for placement of the at least one media item from the remote media store into the group basket 37.

The method also comprises selecting, at 65, at least one media item from the user-owned library 112. In one example, the selecting 65 comprises receiving, also at 65, a user selection of the at least one media item from the user-owned library 112 and receiving a user selection for placement of the at least one media item from the user-owned library into a group basket 37.

Once the media items are selected 63, 65, the method further comprises initiating, at 67, generation of a group of at least two media items. In particular, selected media items originate from both the user-owned library 112 and the remote media store 126. According to the present method, this initiating 67 occurs in response to a single action being performed, such as by a user. In one exemplary embodiment, the single action being performed is receiving, at 69, a user selection requesting generation of the group of at least two media items. The user can select group generation by several methods, including requesting that the group be played by a media player application 116, requesting that the group be synchronized by a media player application (e.g., as a playlist), and requesting that the group be persistently stored to a memory (e.g., a CD, a disc drive, a flash memory, a DVD, a USB drive, a portable media device, a game console, etc.). Other single actions for initiating generation of the group of media items are also contemplated as within the scope of the present invention. Moreover, the group may be stored to any type of memory, in addition to those discussed immediately above.

The method further comprises purchasing and downloading 71 the media items selected from the remote media store 126 via the network 104 upon receipt 69 of the user selection requesting generation of the group of at least two media items. In one example, the method may further prompt, at 73, a user for permission to purchase the media items accessible from the remote media store 126 of media items after the initiating (see dialog box 81 of FIG. 14). The prompting 73 may occur per individual media item, on the media items as a group, or on either the individual media items or the group at the direction of the user.

In operation, computer 102 executes a computer-implemented method of operation on one or more data processing devices such as described above for managing, by a computer, media items with a computing device executing a media player application for rendering one or more of the media items to a user and coupled to a data communication network. The computer 102 (or its components) selects at least one media item from a user-owned library 112 containing one or more media items owned by the user. The computer 102 (or its components) selects at least one other media item from a remote media store 126 containing one or more media items accessible by the computer via the network 104. The computer 102 (or its components), in response to a single action being performed, initiates generation of a group of at least two media items as selected from both the user-owned library 112 and the remote media store 126 of media items.

Other Exemplary User Interfaces

Figure 10:
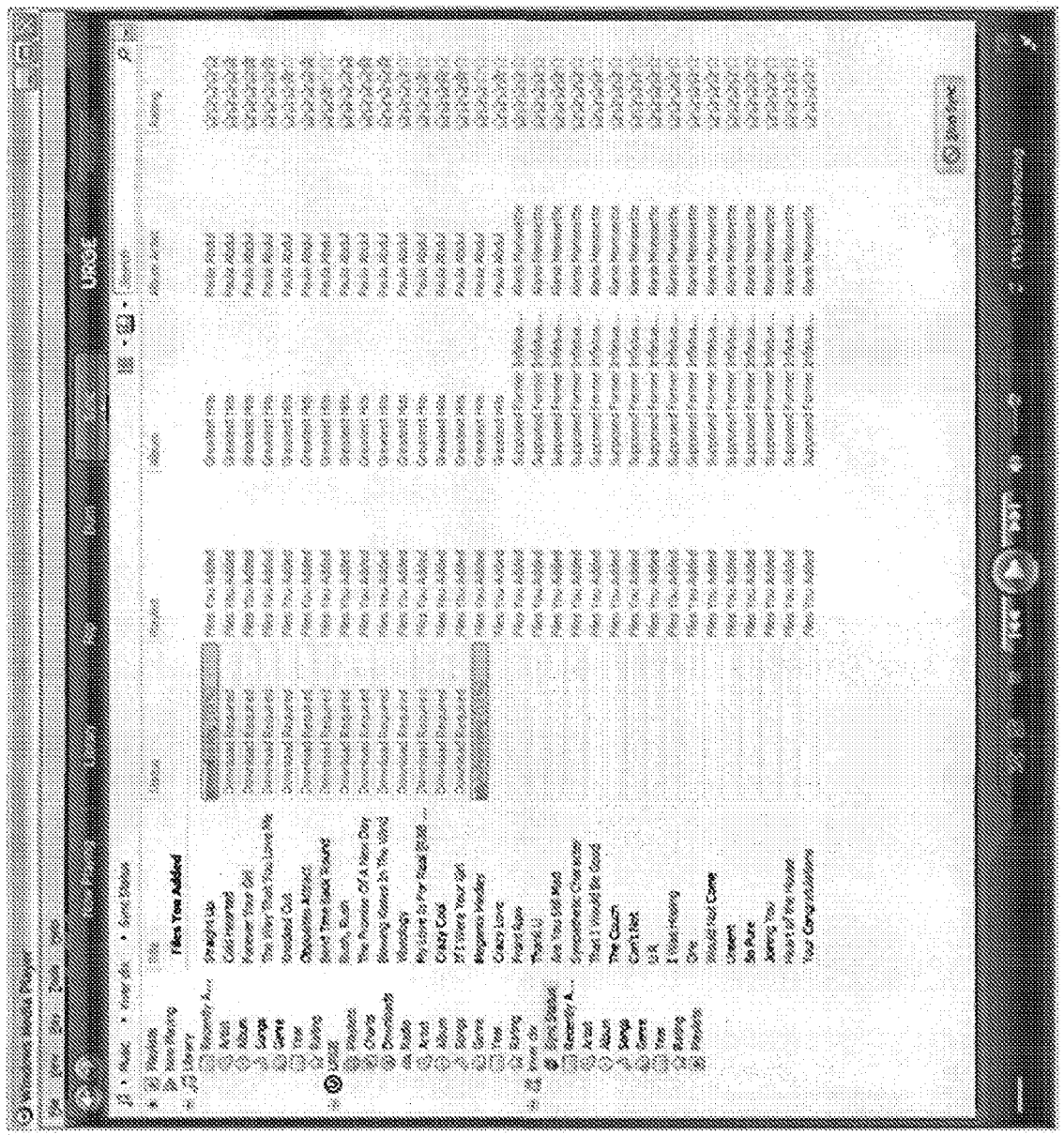
Figure 11:
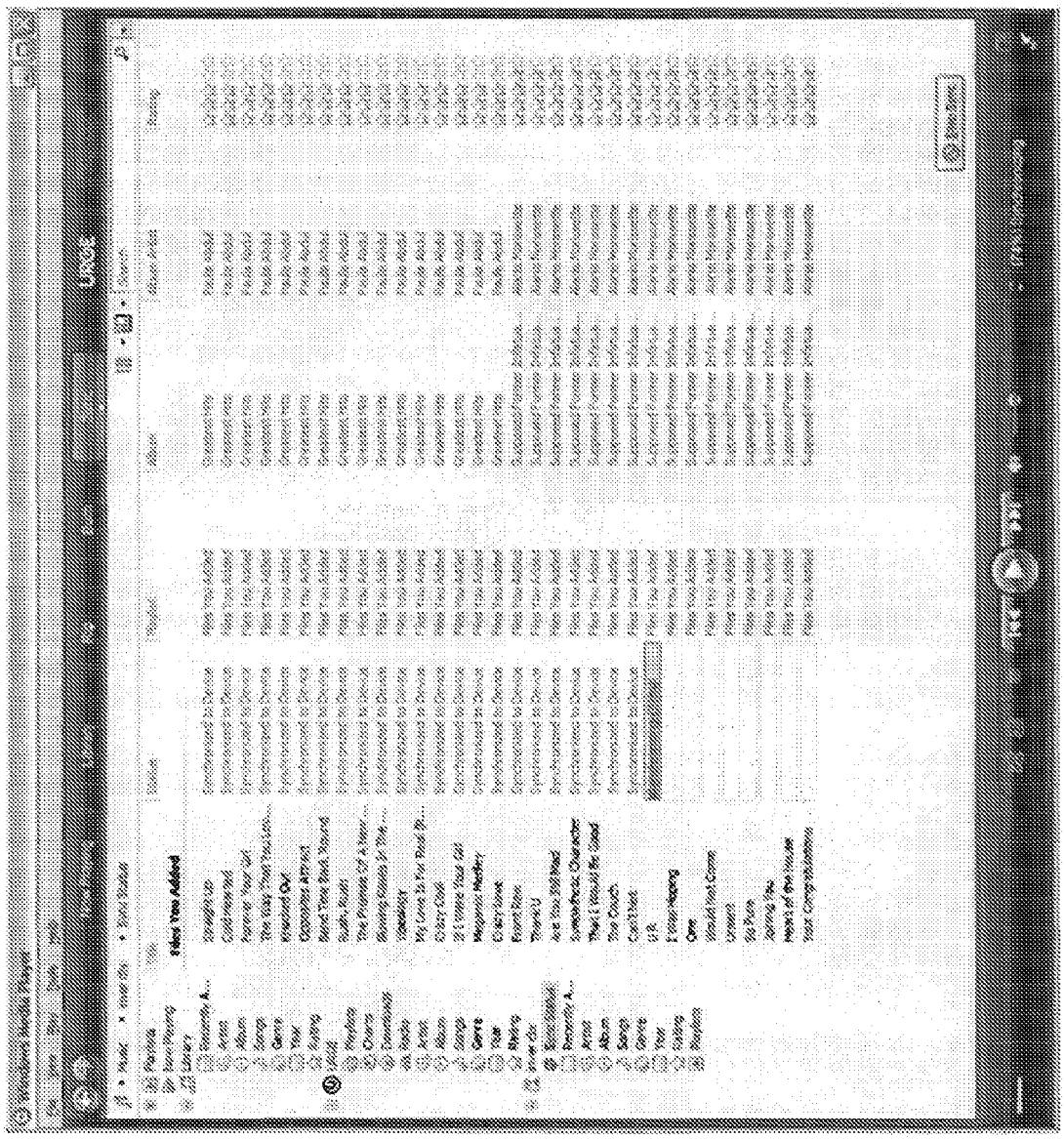

Referring now to FIGS. 10 and 11, an exemplary user interface 25C demonstrates how media items from different sources are both downloaded and synchronized simultaneously. In FIG. 10, for example, the media items selected from the remote media library 126 are being downloaded, while the media items from the local library 112 are being synchronized to the memory. These processes can occur simultaneously, in response to a single action by a user. In FIG. 11, all of the media items from the group basket 37 have been downloaded, whereby the only process remaining is synchronization of the downloaded media items to the memory. Again, this multi-step process is accomplished by a single action by the user.

Figure 12:
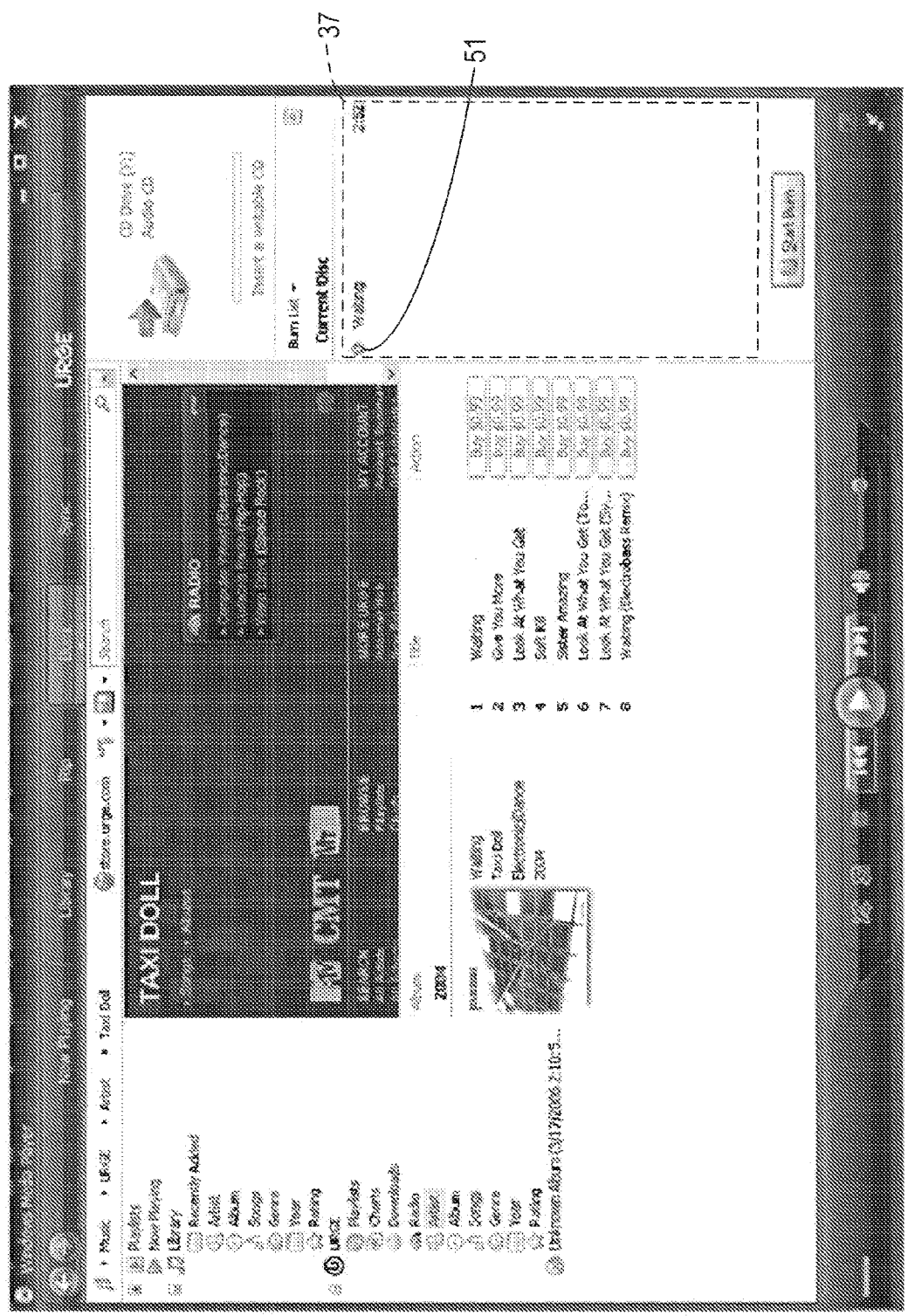
Figure 13:
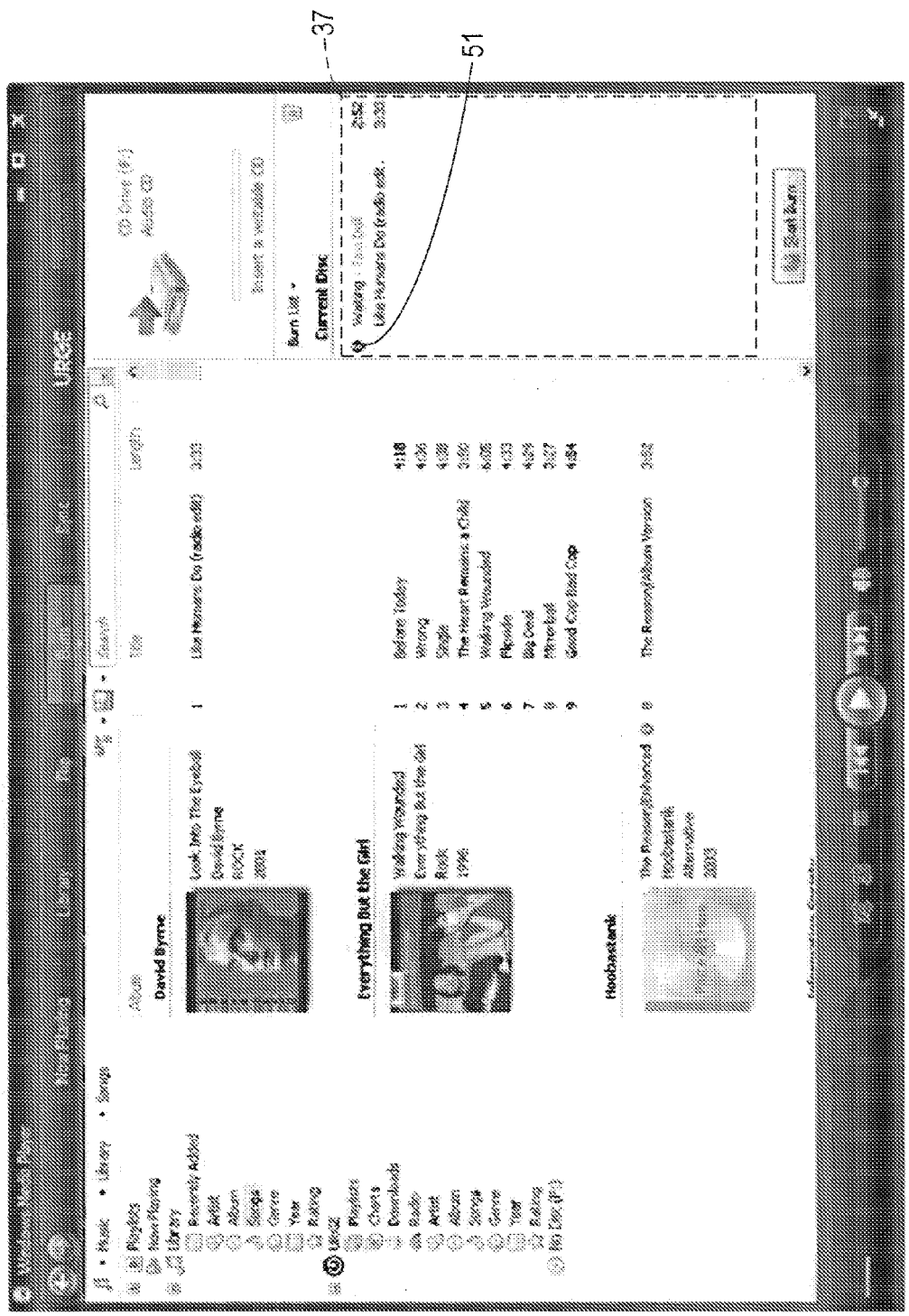

Referring now to FIGS. 12-18, an exemplary user interface 25D demonstrates how media items are purchased and downloaded from a subscription service with a single action. In particular, the user interface 25D of FIG. 12 depicts a single media item placed in the group basket 37. The indicator 51 in the group basket 37 indicates that the media items are available for purchase from the remote media store 126, rather than the user-owned library 112. Turning to FIG. 13, a second media item from a user-owned library 112 has been added to the group basket 37. This second media item does not include an indicator 51 adjacent the media item because the item is from the user-owned library 112.

Figure 14:
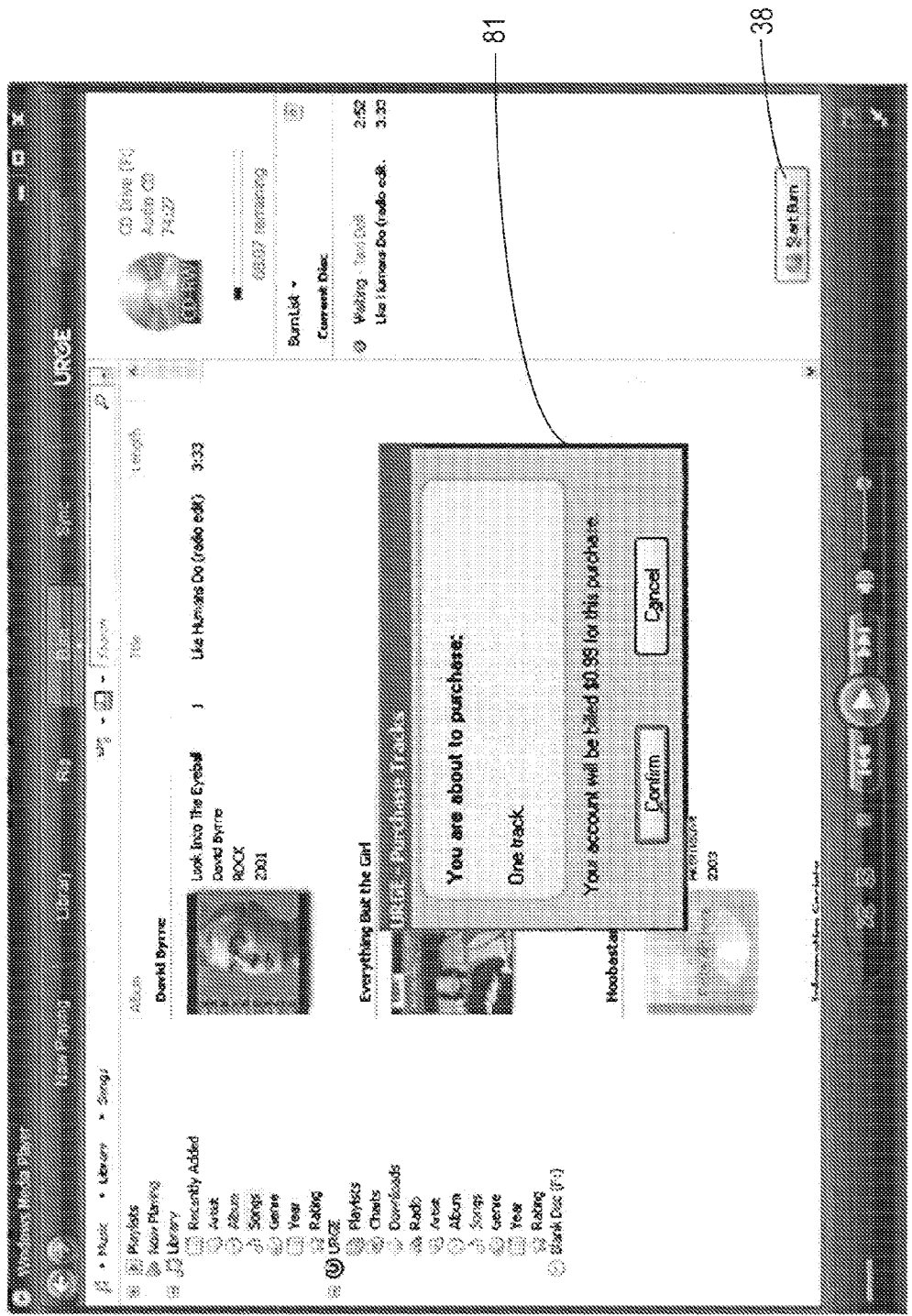
Figure 15:
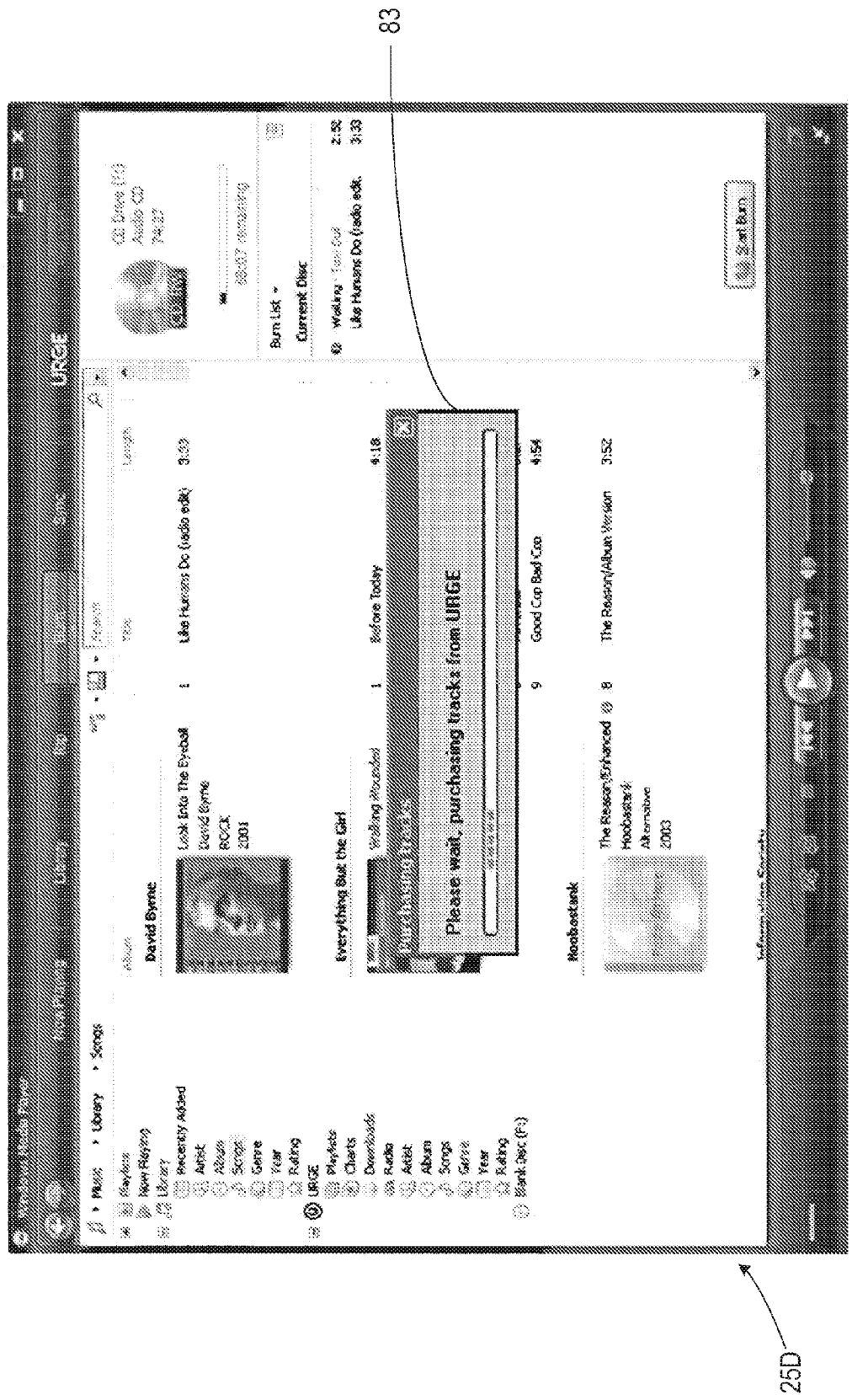
Figure 16:
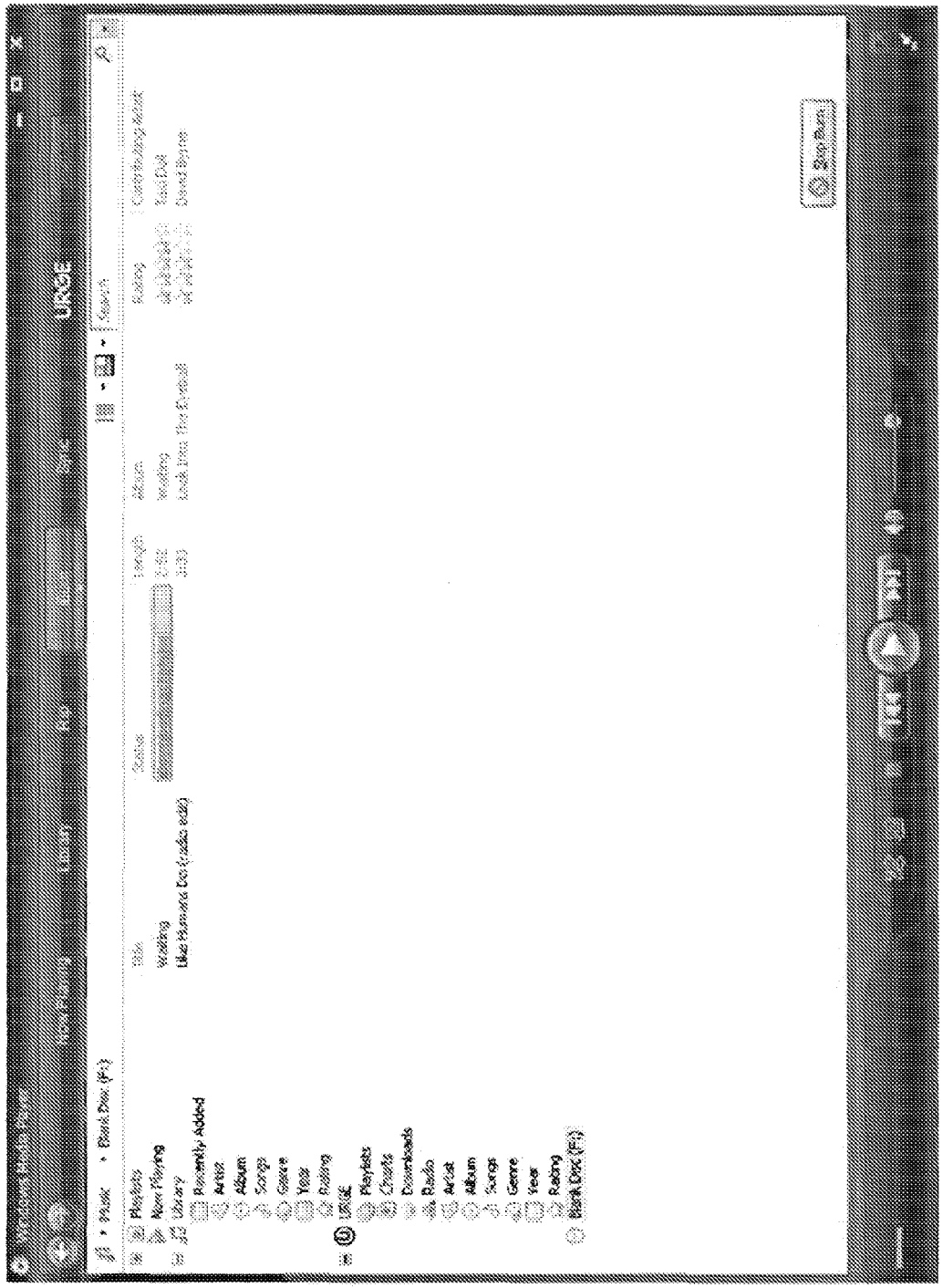
Figure 17:
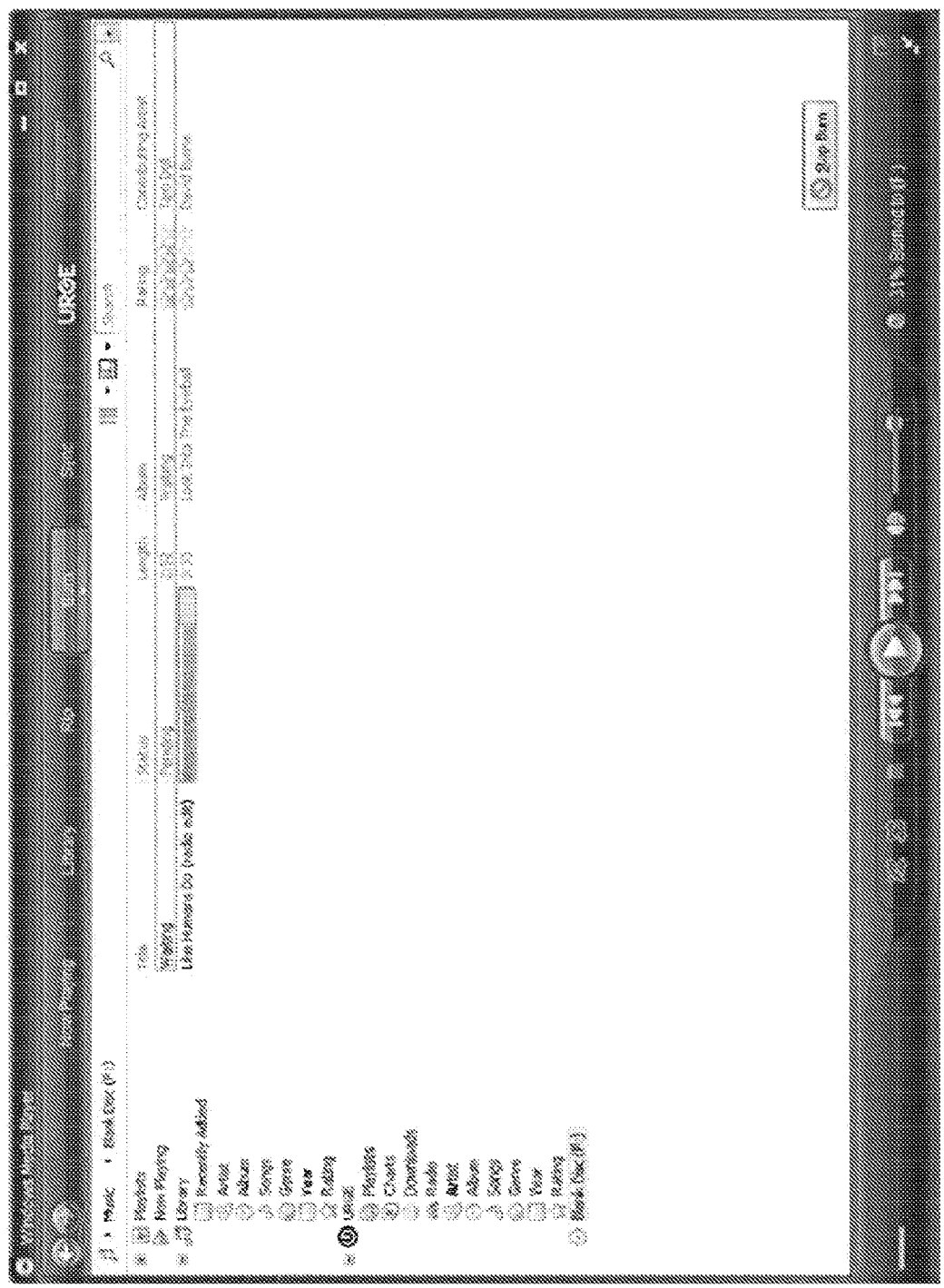
Figure 18:
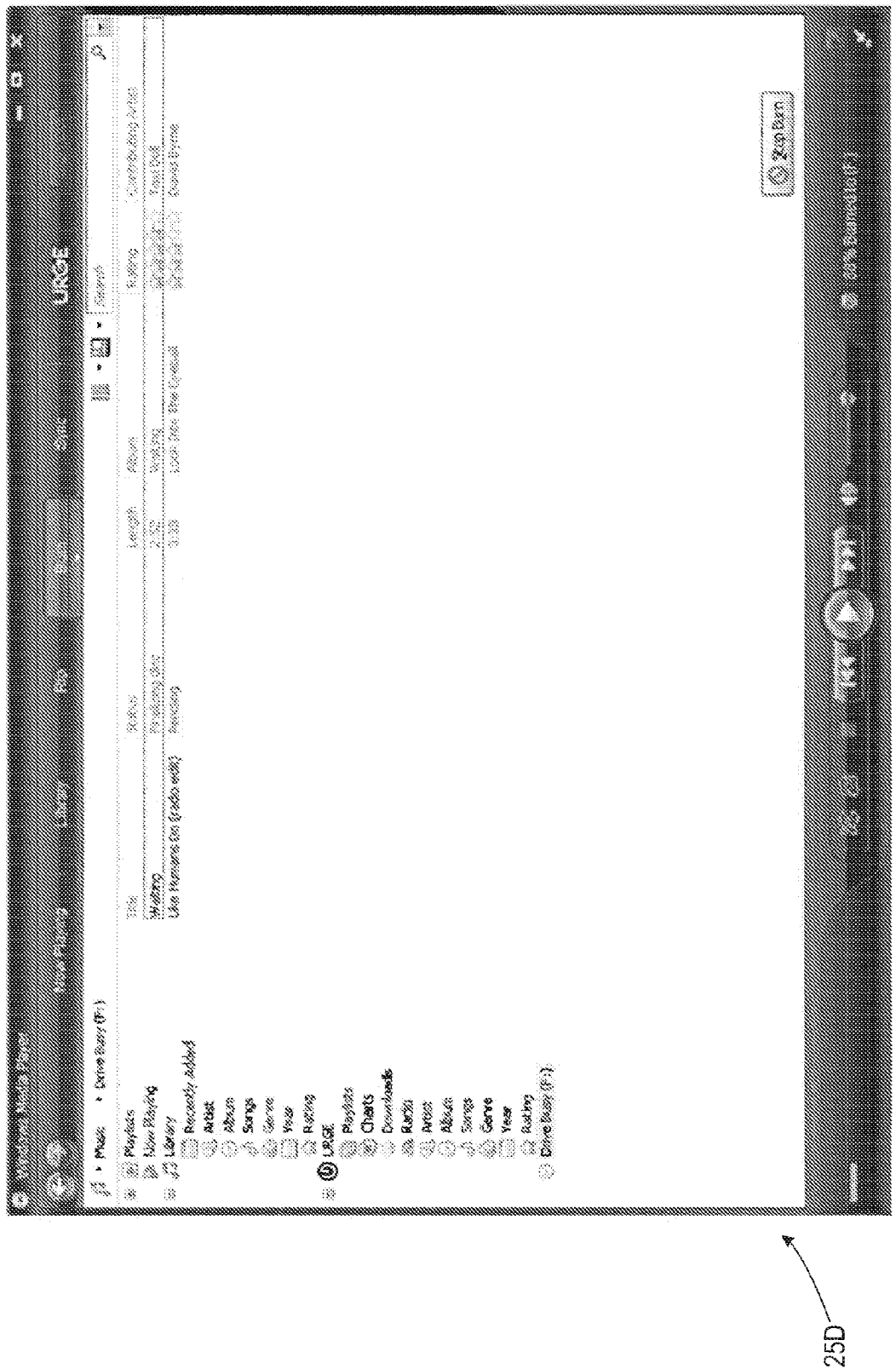

Concerning FIG. 14, the "Start Burn" selection element 38 has been selected and the user is prompted 73, as discussed above, via a dialog box 81, to confirm purchase of one or more media items. In another example, the user may select a media player application 116 setting providing blanket approval of any such purchases, whereby the formality of prompting the user with a dialog box confirming purchase may be avoided. Once the user submits purchase approval, another dialog box 83 appears (FIG. 15), confirming purchase of the tracks. The user interfaces 26D of FIGS. 16-18 further demonstrate the downloading and purchasing steps discussed above (see FIGS. 10 and 11).

Universal Playlist

Figure 19:
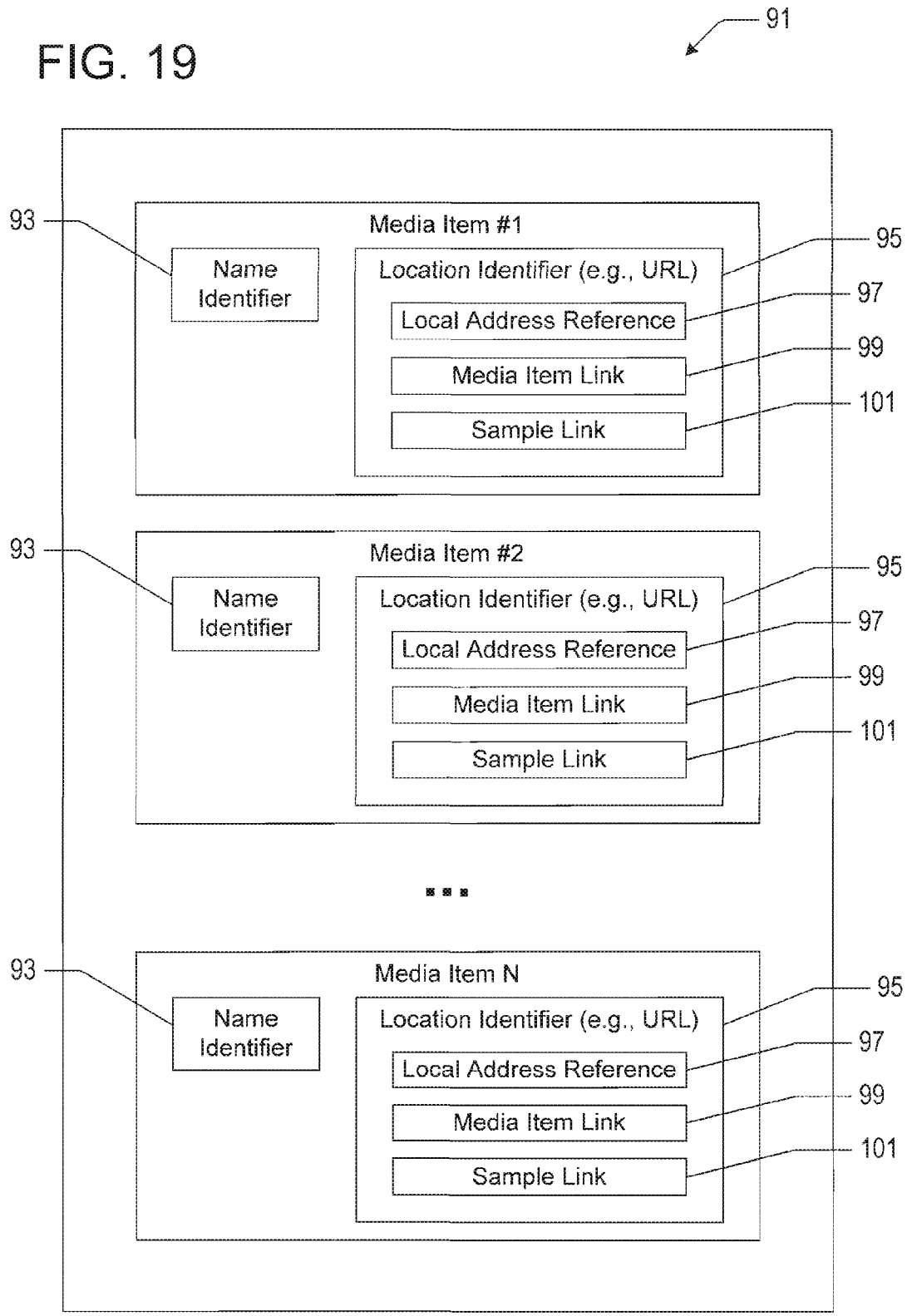
FIG. 19 is diagram of a universal playlist according to one embodiment of the invention.

Referring to FIG. 19, a computer-readable medium having a data structure stored thereon representative of a universal playlist of media items adapted for sharing among multiple users is generally depicted 91. The universal playlist 91 is adapted for identifying the media items contained in the playlist and for identifying an access location associated with each media item. With such a universal playlist 91, each user of the playlist may access the media items of the playlist according to individually-held access rights of each user with respect to each media item. Because the playlist 91 is universal, there is no translation required between users. Thus, sharing of playlists among multiple users is encouraged. Moreover, users may share the universal playlist 91 over any number of different media player applications 116 running on different types of devices. For example, a user may create such a universal playlist 91 on a media player application 116 running on a first computer 102 (e.g., a personal computer), and the same universal playlist may be accessed as described above on a second computer, such as a video game console or a portable media device, among others.

The universal playlist 91 comprises a name identifier 93 corresponding to each media item in the playlist. The universal playlist 91 also comprises a location identifier 95 corresponding to each name identifier 93 in the playlist. The location identifier 95 provides an address whereby the user can obtain access to the media items of the universal playlist 91 only to the extent the user has access rights with respect to each media item. In one example, the location identifier comprises a URL. Each location identifier comprises a local address reference 97, a media item link 99, and a sample link 101. The local address reference 97 is adapted to direct the media player application 116 (e.g., executed by a computing device 102) to access to the media item from the user-owned library 112. The media item link 99 is adapted to direct the media player application 116 to offer access to the media item from a remote media store 126 containing one or more media items available for purchase and accessible by the computer 102 via the network 104. The sample link 101 is adapted to direct the media player application 116 to access a sample portion of the media item from the remote media store 126 containing one or more media items available for purchase, or from some other sample media store.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A computer-implemented method for managing media items with a user computing device coupled to a data communication network, said computing device executing a media player application for rendering one or more of the media items to a user, said method comprising:
    selecting, via the user computing device, at least one media item from a user-owned library associated with the user computing device, said user-owned library containing one or more media items owned by the user and having a first format;
    placing the selected at least one media item from the user-owned library into a group basket;
    selecting, via the user computing device, at least one remote media item from a remote media store containing one or more remote media items, said remote media items not owned by the user and having a second format different from the first format, said remote media items accessible by the user computing device via the network, said remote media store being separate from the user-owned library;
    placing the selected at least one remote media item from a remote media store into the group basket; and
    in response to a single action being performed, initiating generation of the selected media items in the group basket including at least one media item from the user-owned library and including at least one remote media item from the remote media store, wherein the initiated generation includes purchasing and downloading the selected at least one remote media item in the group basket to the user computing device without further user interaction, wherein the group of media items corresponds to the selected media item and wherein the generated group of media items corresponds to the selected remote media item, said single action including at least one of requesting that said generated group be played by a media player application, requesting that said generated group be synchronized by a media player application as a new playlist, and requesting that said group be persistently stored to a memory.

2. A computer-implemented method for providing services to a user related to a group of at least two media items, said media items being adapted for rendering to the user by a media player application, said media player application being executed by a user computing device coupled to a data communication network, said method comprising:
    selecting via the user computing device at least one media item from a user-owned library associated with the user computing device, said user-owned library containing one or more media items owned by the user and having a first format, said selected media item being included in the group of at least two media items;
    placing the selected at least one media item from the user-owned library into a group basket;
    selecting via the user computing device at least one remote media item from a remote media store containing one or more remote media items, said remote media items not owned by the user and having a second format different from the first format, said remote media items accessible by the user computing device via the network, said remote media store being separate from the user-owned library, said selected remote media item being included in the group of at least two media items;
    placing the selected at least one remote media item from a remote media store into the group basket;
    applying instructions received from the user via the computing device to generate the group of at least two media items in the group basket, said instructions including at least one of requesting that said generated group be played by a media player application, requesting that said generated group be synchronized by a media player application as a new playlist, and requesting that said generated group be persistently stored to a memory, said received instructions being applied similarly to the media items collected from the user-owned library of media items and to the media items collected from the remote media store, wherein said generating includes purchasing and downloading the selected at least one remote media item in the group basket to the user computing device without further user interaction; and
    providing a user interface on the computing device that displays the generated group including both the media items accessible from the user-owned library and the media items accessible from the remote media store in an integrated display, whereby the user interface provides to the user functional parity on the user computing device between media items accessible from the user-owned library and media items accessible from the remote media store within the user interface.

3. A computer-implemented method as set forth in claim 2 wherein said providing a user interface comprises providing a directory tree wherein one branch provides access to the user-owned library and another branch provides access to the remote media store.

4. A computer-implemented method as set forth in claim 2 wherein said providing a user interface comprises providing a display area for simultaneous display of media items stored in the user-owned library and media items accessible from the remote media store.

5. A computer-implemented method as set forth in claim 4 wherein said providing a user interface comprises providing an indicator in the display area corresponding to each media item for indicating whether the corresponding media item is either stored in the user-owned library or accessible from the remote media store.

6. A computer-implemented method as set forth in claim 5 wherein said providing an indicator in the display area indicating that media items are accessible from the remote media store further comprises providing a selection element in the display area associated only with each indicator for selectively purchasing the media items.

7. A computer-implemented method as set forth in claim 2 wherein said providing a user interface comprises providing a selection element adapted for persistently storing the media item group collected in the group basket.

8. A computer-implemented method as set forth in claim 7 wherein said providing a selection element adapted for persistently storing the media item group is further adapted for burning the media items collected in the group basket to at least one of a CD, a disc drive, a flash memory, a DVD, a USB drive, a portable media device, and a game console;
wherein said method of providing a user interface further comprises providing a display of the available memory space for stored media items on the at least one of the CD, the disc drive, the flash memory, the DVD, the USB drive, the portable media device, and the game console.

9. A computer-implemented method as set forth in claim 8 wherein said providing a user interface comprises providing a display of the memory space required for the media items collected in the group basket as a portion of the display of available memory space for stored media items on the at least one of the CD, the disc drive, the flash memory, the DVD, the USB drive, the portable media device, and the game console.

10. A computer-implemented method as set forth in claim 2 wherein said providing a user interface comprises providing an indicator in the group basket for each of the media items accessible from the remote media store indicating that such media items are available for purchase from the remote media store, and not from the user-owned library.

11. A computer-implemented method for providing services to a user related to a group of at least two media items, said media items being adapted for rendering to the user by a media player application, said media player application being executed by a user computing device coupled to a data communication network, said method comprising:
selecting, via the user computing device, at least one media item from a user-owned library associated with the user computing device, said user-owned library containing one or more media items owned by the user and having a first format, said selected media item being included in a group basket;
selecting, via the user computing device, a remote media item from a remote media store containing one or more remote media items, said remote media items not owned by the user and having a second format different from the first format, said remote media items accessible by the user computing device via the network, said remote media store being separate from the user-owned library, said selected remote media item being included in the group basket;
receiving, from the user via the user computing device, instructions to generate the group of at least two media items in the group basket, said instructions including at least one of requesting that said generated group be played by a media player application, requesting that said generated group be synchronized by a media player application as a new playlist, and requesting that said generated group be persistently stored to a memory;
generating the group of at least two media items based on the received instructions, said received instructions being applied similarly to the media items collected from the user-owned library of media items and to the media items collected from the remote media store, wherein said generating includes purchasing the remote media item in the group basket without further user interaction; and
providing a user interface on the computing device that displays the generated group of both the media items accessible from the user-owned library and the media items accessible from the remote media store in an integrated display, whereby the user interface provides to the user functional parity on the user computing device between media items accessible from the user-owned library and media items accessible from the remote media store within the user interface;
wherein said providing a user interface comprises providing an indicator in the display area corresponding to each media item for indicating whether the corresponding media item is either stored in the user-owned library or accessible from the remote media store.

12. A computer-implemented method as set forth in claim 11 wherein said providing a user interface comprises providing a directory tree wherein one branch provides access to the user-owned library and another branch provides access to the remote media store.

13. A computer-implemented method as set forth in claim 11 wherein said providing a user interface comprises providing a display area for simultaneous display of media items stored in the user-owned library and media items accessible from the remote media store.

14. A computer-implemented method as set forth in claim 11 wherein said providing a user interface comprises providing a selection element adapted for persistently storing the media item group collected in the group basket.

15. A computer-implemented method as set forth in claim 14 wherein said providing a selection element adapted for persistently storing the media item group is further adapted for burning the media items collected in the group basket to at least one of a CD, a disc drive, a flash memory, a DVD, a USB drive, a portable media device, and a game console;
wherein said method of providing a user interface further comprises providing a display of the available memory space for stored media items on the at least one of the CD, the disc drive, the flash memory, the DVD, the USB drive, the portable media device, and the game console.

16. A computer-implemented method as set forth in claim 15 wherein said providing a user interface comprises providing a display of the memory space required for the media items collected in the group basket as a portion of the display of available memory space for stored media items on the at least one of the CD, the disc drive, the flash memory, the DVD, the USB drive, the portable media device, and the game console.

17. A computer-implemented method as set forth in claim 11 wherein said providing a user interface comprises providing a group basket adapted for collection of media items accessible from both the user-owned library and the remote media store and wherein said providing a user interface comprises providing an indicator in the group basket for each of the media items accessible from the remote media store indicating that such media items are available for purchase from the remote media store, and not from the user-owned library.

* * * * *